(12) United States Patent
Ordentlich et al.

(10) Patent No.: US 7,783,123 B2
(45) Date of Patent: Aug. 24, 2010

(54) METHOD AND SYSTEM FOR DENOISING A NOISY SIGNAL GENERATED BY AN IMPULSE CHANNEL

(75) Inventors: Erik Ordentlich, San Jose, CA (US); Ignaclo Ramirez, Montevideo (UY); Gadiel Seroussi, Cupertino, CA (US); Marcelo Weinberger, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1003 days.

(21) Appl. No.: 11/527,062

(22) Filed: Sep. 25, 2006

(65) Prior Publication Data

US 2008/0075206 A1 Mar. 27, 2008

(51) Int. Cl.
*G06K 9/40* (2006.01)
*G06K 9/62* (2006.01)
(52) U.S. Cl. .................................. 382/254; 382/224
(58) Field of Classification Search .............. 382/224, 382/228, 229; 358/3.26; 375/346
See application file for complete search history.

(56) References Cited

U.S. PATENT DOCUMENTS

| | | | | |
|---|---|---|---|---|
| 5,646,961 A | * | 7/1997 | Shoham et al. | 375/243 |
| 5,778,095 A | * | 7/1998 | Davies | 382/225 |
| 6,792,402 B1 | * | 9/2004 | Chen | 704/200.1 |
| 6,947,179 B2 | * | 9/2005 | Cordery et al. | 358/3.26 |
| 2006/0045218 A1 | * | 3/2006 | Ordentlich et al. | 375/346 |
| 2007/0086058 A1 | * | 4/2007 | Ordentlich et al. | 358/3.26 |

OTHER PUBLICATIONS

Weissman, Tsachy et al., "Universal Discrete Denoising: Known Channel", Jan. 2005, IEEE, vol. 51, No. 1, pp. 5-28.

* cited by examiner

*Primary Examiner*—Yon Couso

(57) ABSTRACT

In various embodiments of the present invention, a binary mask corresponding to a noisy symbol sequence is produced to indicate which of the symbols in the noisy symbol sequence has potentially been modified, or altered, by a noisy channel. DUDE, DUDE-CTI, and other denoising methods are modified to employ the bit mask in order to avoid the computational overhead and potential errors incurred in attempting to denoise symbols that are not likely to have been altered by the noisy channel.

22 Claims, 30 Drawing Sheets

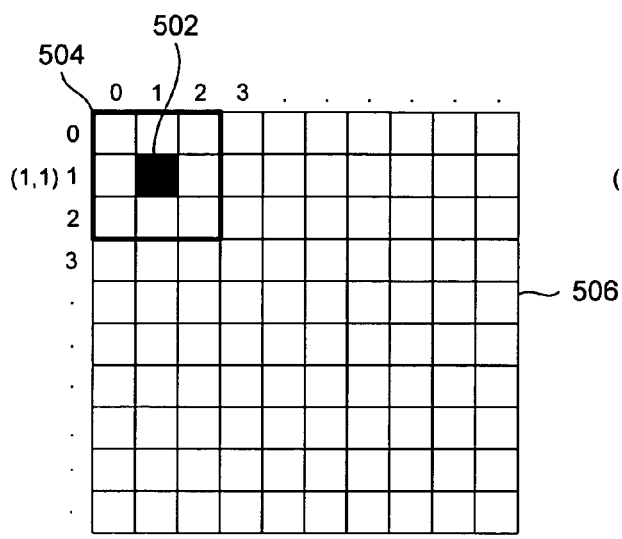
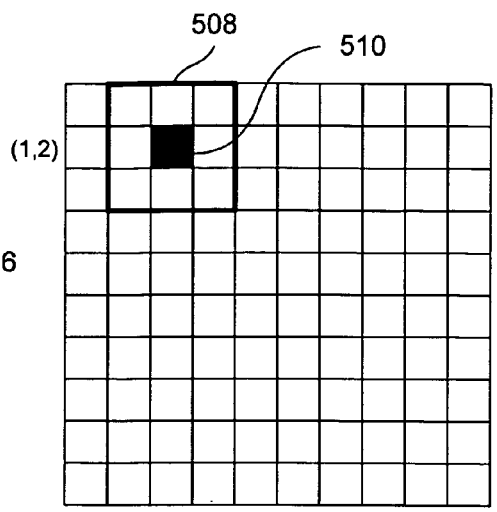
*Figure 5A*  *Figure 5B*
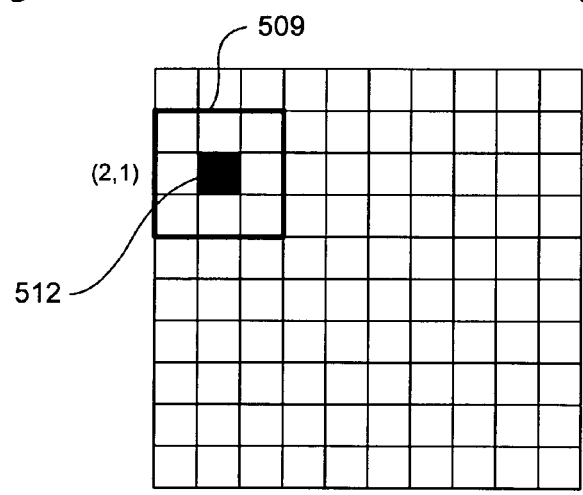
*Figure 5C*
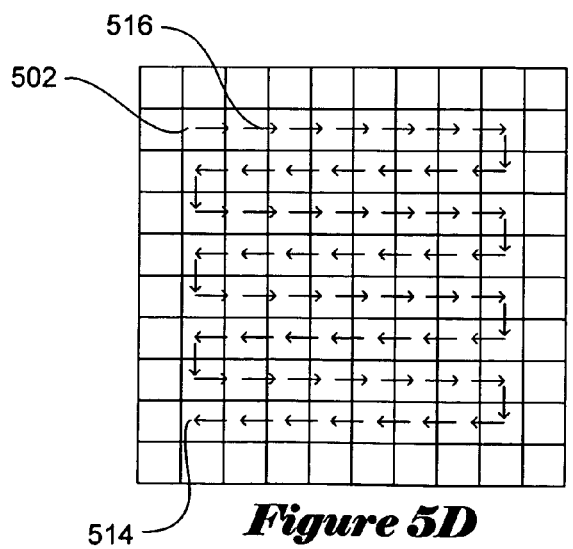
*Figure 5D*

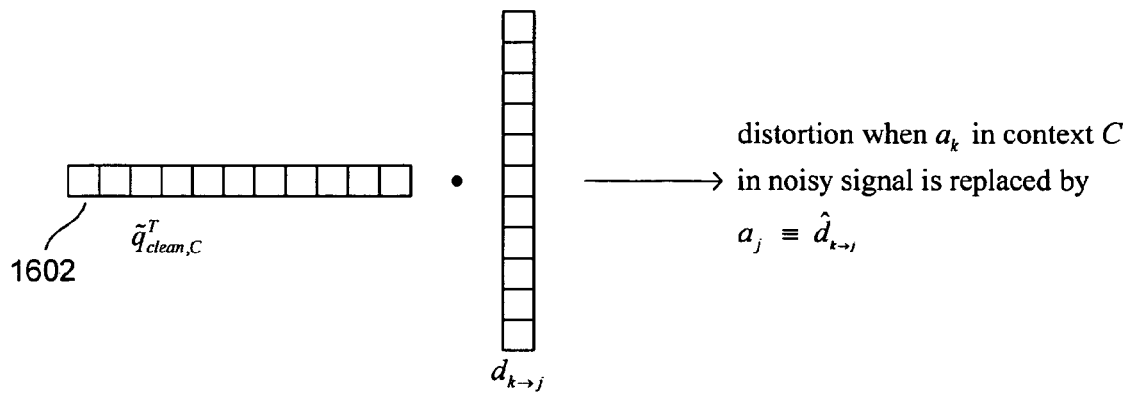
Figure 16
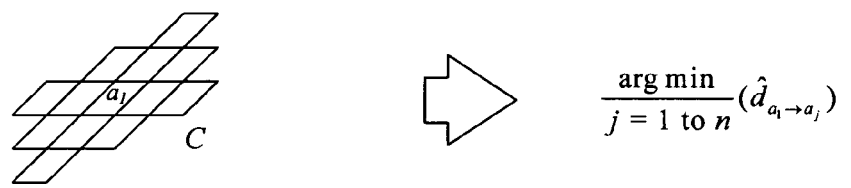
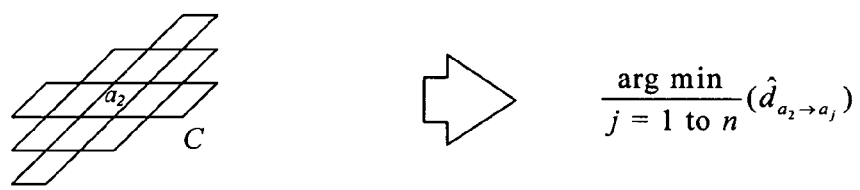
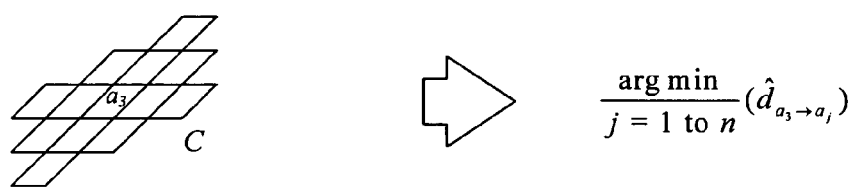
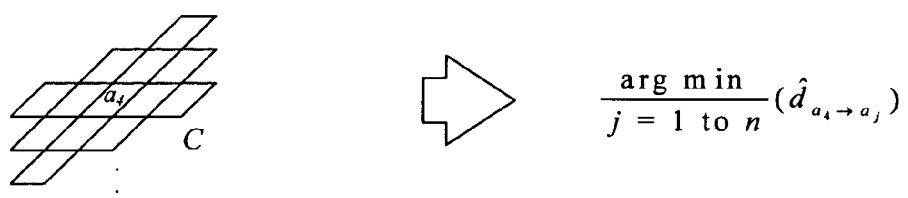
Figure 17

$$X \begin{bmatrix} Px_{a_1} \\ Px_{a_2} \\ Px_{a_3} \\ Px_{a_4} \\ Px_{a_5} \\ \\ Px_{a_n} \end{bmatrix} \begin{matrix} a_1 \\ a_2 \\ a_3 \\ a_4 \\ a_5 \\ \\ a_n \end{matrix}$$

$$Px$$

$$\begin{bmatrix} 1-\frac{\lambda}{2} & 0 & \cdots & \frac{\lambda}{2} & \frac{\lambda}{2} & \frac{\lambda}{2} \\ \frac{\lambda}{2} & 1-\lambda & 0 & 0 & \cdots & \frac{\lambda}{2} \\ \vdots & & \ddots & & & \vdots \\ \frac{\lambda}{2} & 0 & 0 & 1-\lambda & 0 & \frac{\lambda}{2} \\ \frac{\lambda}{2} & 0 & \cdots & 0 & 1-\lambda & \frac{\lambda}{2} \\ \frac{\lambda}{2} & 0 & \cdots & 0 & 0 & 1-\frac{\lambda}{2} \end{bmatrix}$$

$$\pi$$

$$= \begin{bmatrix} \left(1-\frac{\lambda}{2}\right)Px_{a_1}+\frac{\lambda}{2}Px_{a_2}+\cdots+\frac{\lambda}{2}Px_{a_3} & (1-\lambda)Px_{a_2} & (1-\lambda)Px_{a_3} & \cdots & \frac{\lambda}{2}Px_{a_1}+\frac{\lambda}{2}Px_{a_2}+\cdots+\left(1-\frac{\lambda}{2}\right)Px_{a_n} \end{bmatrix}$$

$$\begin{matrix} a_1 & a_2 & a_3 & p_z & a_n \end{matrix}$$

Figure 20

First Pass

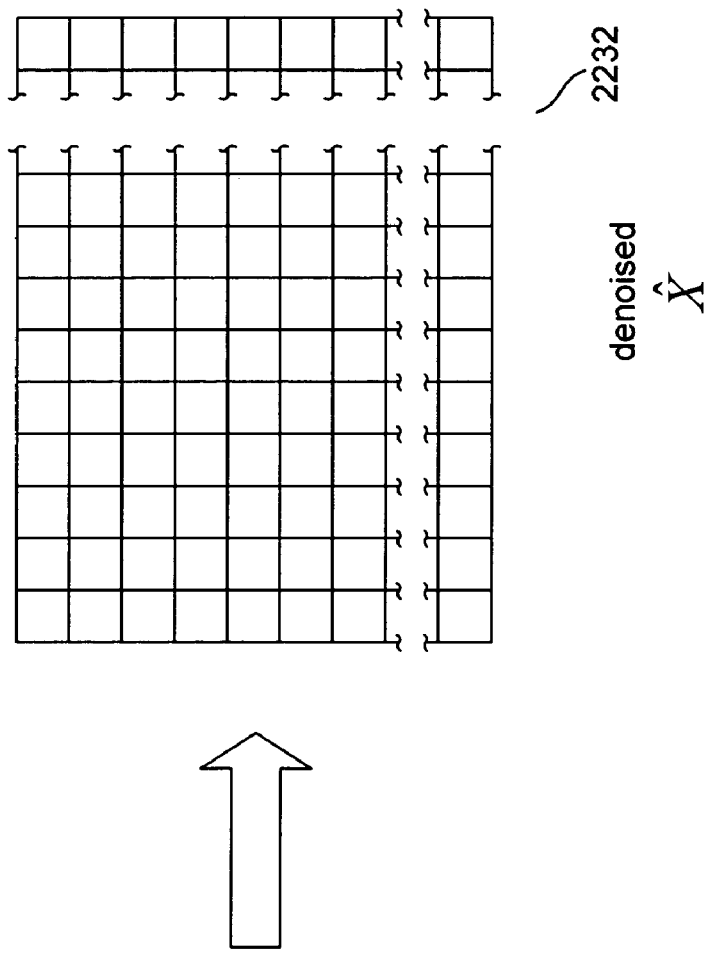
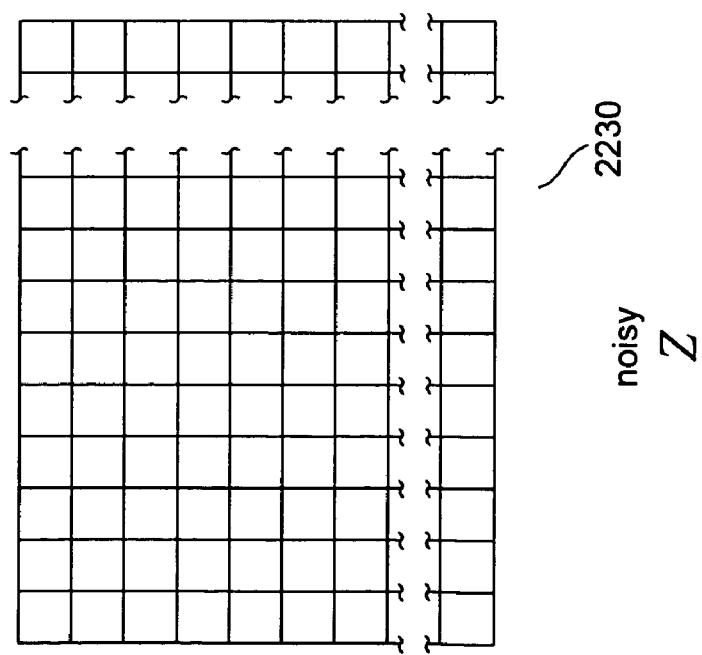
Figure 22C

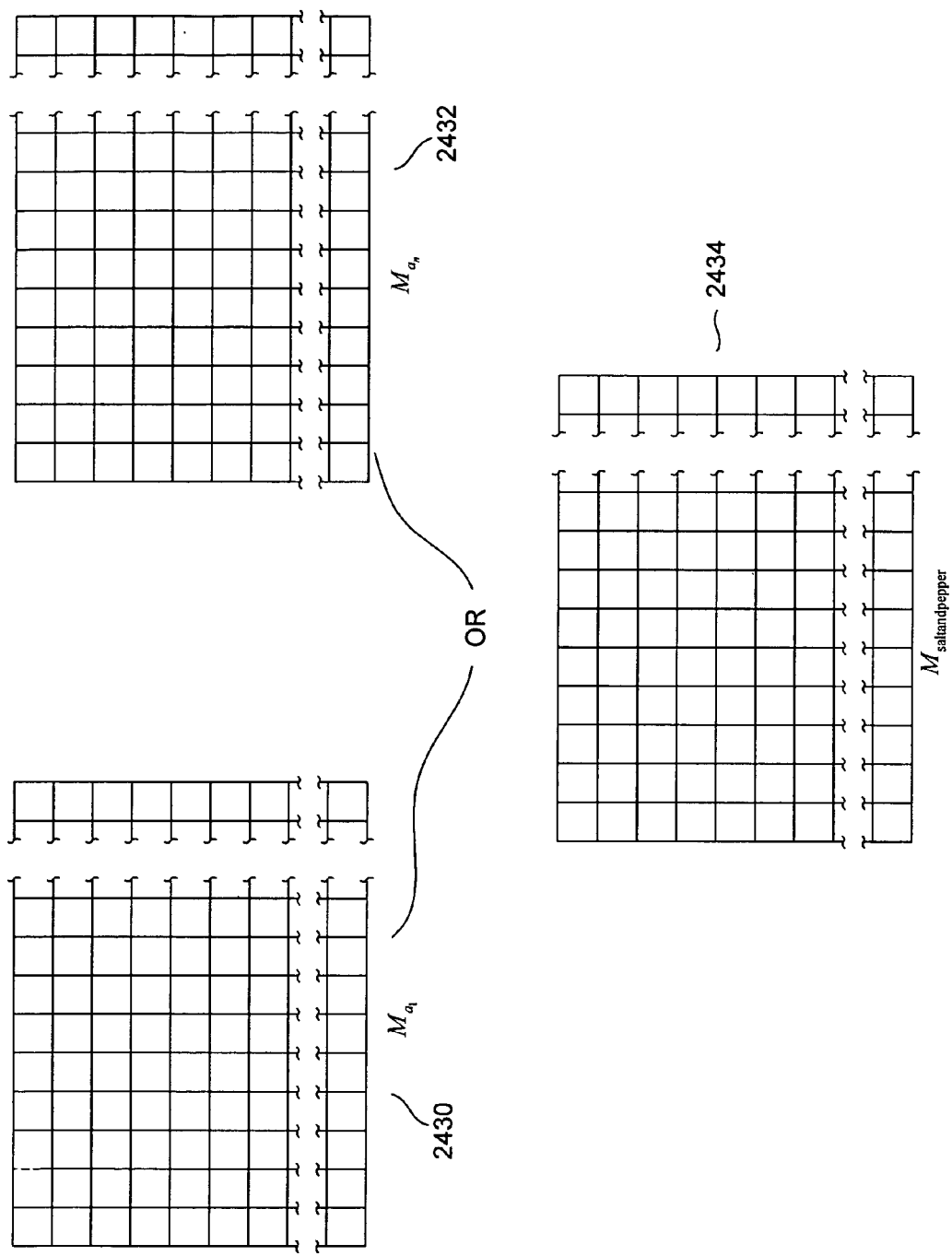

METHOD AND SYSTEM FOR DENOISING A NOISY SIGNAL GENERATED BY AN IMPULSE CHANNEL

TECHNICAL FIELD

The present invention is related to denoising of data passed through a noisy channel and, in particular, to a method and system for recovering clean data from noisy data received through an impulse channel.

BACKGROUND OF THE INVENTION

Whenever information is electronically encoded as original, or clean, data, and then transferred from the data source to a data destination, noise may be introduced by the transfer process, resulting in alteration of the original, clean data and reception of the data by the data destination as noisy data. For example, when information is electronically encoded as a sequence of binary bits and sent through a communications network, such as a local Ethernet, to a destination node, there is a small probability that any given bit within the original, or clean, sequence of binary bits ends up being corrupted during transfer through the Ethernet, resulting in a "0" bit in the clean data being altered to a "1" bit in the noisy data received at the destination node, or a "1" bit in the clean data altered to a "0" bit in the noisy data received at the destination node. Although electronic communications media are classic examples of noisy channels, almost any type of data transfer or storage may result in data corruption, and therefore may be modeled as a noisy channel. For example, there is a small probability, associated with each bit of a block of binary data, that the bit will be altered when the block of data is stored and then retrieved from a hard disk, or even when the block of data is transferred from local cache memory to global random-access memory within a computer system. In general, redundant data, including check sums and cyclical redundancy codes, are embedded into data encodings to allow corrupted data to be detected and repaired. However, the amount of redundant data needed, and the accompanying costs and inefficiencies associated with redundant data, grows as the acceptable level of undetectable and/or unrepairable data corruption decreases.

In many cases, data corruption may occur prior to a point in a process at which redundant information can be embedded into a data signal to facilitate error detection and correction. As one example, a scanner that optically scans a printed document to produce a digital, electronic encoding of an image of the document can be viewed as a noisy channel in which discrepancies between the digitally encoded image of the document and the original document may arise. Such discrepancies may be introduced by a variety of optical and electronic components within the scanner that focus an optical image of the document onto a light-detecting component that transforms the detected optical image into an electronically encoded image of the document. When the digitally encoded image of the document is displayed or printed, different types of noise may be perceived as graininess, irregularities along the edges of text characters or objects within graphical images, uneven shading or coloration, random speckling, or other such visually distinguishable differences between the printed or displayed version of the digitally encoded data and the original document.

Denoising techniques can be applied to a noisy, digitally encoded image in order to produce a denoised, digitally encoded image that more accurately represents the original document that was scanned to produce the noisy, digitally encoded image. Denoising techniques may also be applied to data received over channels that are too noisy for recovery of the original data using the redundant data incorporated within the data to facilitate error correction. A wide variety of additional applications of denoising techniques have been identified and are well known. Recently, a discrete universal denoiser method ("DUDE") has been developed for denoising the noisy output signal of a discrete, memoryless data-transmission channel without relying on knowledge of, or assumptions concerning, the statistical properties of the original, or clean, signal input to the discrete, memory-less channel. Even more recently, the DUDE method has been extended for denoising continuous tone images, such as scanned documents or images. The extended DUDE method is referred to as the "DUDE-CTI method," or simply as the "DUDE-CTI." The DUDE-CTI method is intended for use in a variety of image and data scanning, processing, and transfer applications. The DUDE-CTI method has shown promising results for certain types of noisy channels. However, information-theory researchers, denoiser-method developers, and manufacturers and users of a variety of data acquisition, storage, processing, and transfer devices that employ denoisers, have all recognized the need to continue to develop the DUDE and DUDE-CTI methods, and related denoising methods, to better handle salt-and-pepper noise introduced into data by impulse channels.

SUMMARY OF THE INVENTION

In various embodiments of the present invention, a binary classification mask corresponding to a noisy symbol sequence is produced to indicate which of the symbols in the noisy symbol sequence has potentially been modified, or altered, by a noisy channel. DUDE, DUDE-CTI, and other denoising methods are modified to employ the binary mask in order to avoid the computational overhead and potential errors incurred in attempting to denoise symbols that are not likely to have been altered by the noisy channel.

BRIEF DESCRIPTION OF THE DRAWINGS

FIGS. 5A-D illustrate context usage during analysis and denoising of noisy signals.

FIG. 16 illustrates the computation of an estimate of the distortion produced by replacing symbol $a_k$ within context C in a noisy signal by the replacement symbol $a_j$.

FIG. 17 illustrates a symbol-replacement function g(C,z).

FIG. 20 illustrates one mathematical model used for impulse channels that introduce salt-and-pepper noise into data passed through impulse channels.

FIGS. 22A-C illustrate the DUDE/DUDE-CTI context-based denoising techniques.

FIGS. 24A-D illustrate a second method for generation of a binary mask used in modified DUDE and DUDE-CTI denoising methods that represent embodiments of the present invention.

DETAILED DESCRIPTION OF THE INVENTION

The present invention provides enhancements to DUDE, DUDE-CTI, and other context-based denoising methods in order to more effectively apply those denoising methods to noisy signals passed through impulse channels. Embodiments of the present invention generate binary classification masks, each element of which indicates whether or not a corresponding symbol in a noisy symbol sequence is likely to have been altered by the noisy channel. Using the binary mask, the DUDE, DUDE-CTI, or other denoising method can avoid the computational overhead and potential errors incurred in attempting to denoise symbols not likely to have been altered by a salt-and-pepper-noise-introducing channel. In a first subsection, below, the DUDE and DUDE-CTI methods are described. In a second subsection, below, enhancements to the DUDE, DUDE-CTI, and other context-based denoising methods that represent embodiments of the present invention are described.

DUDE and DUDE-CTI

Figure 1:
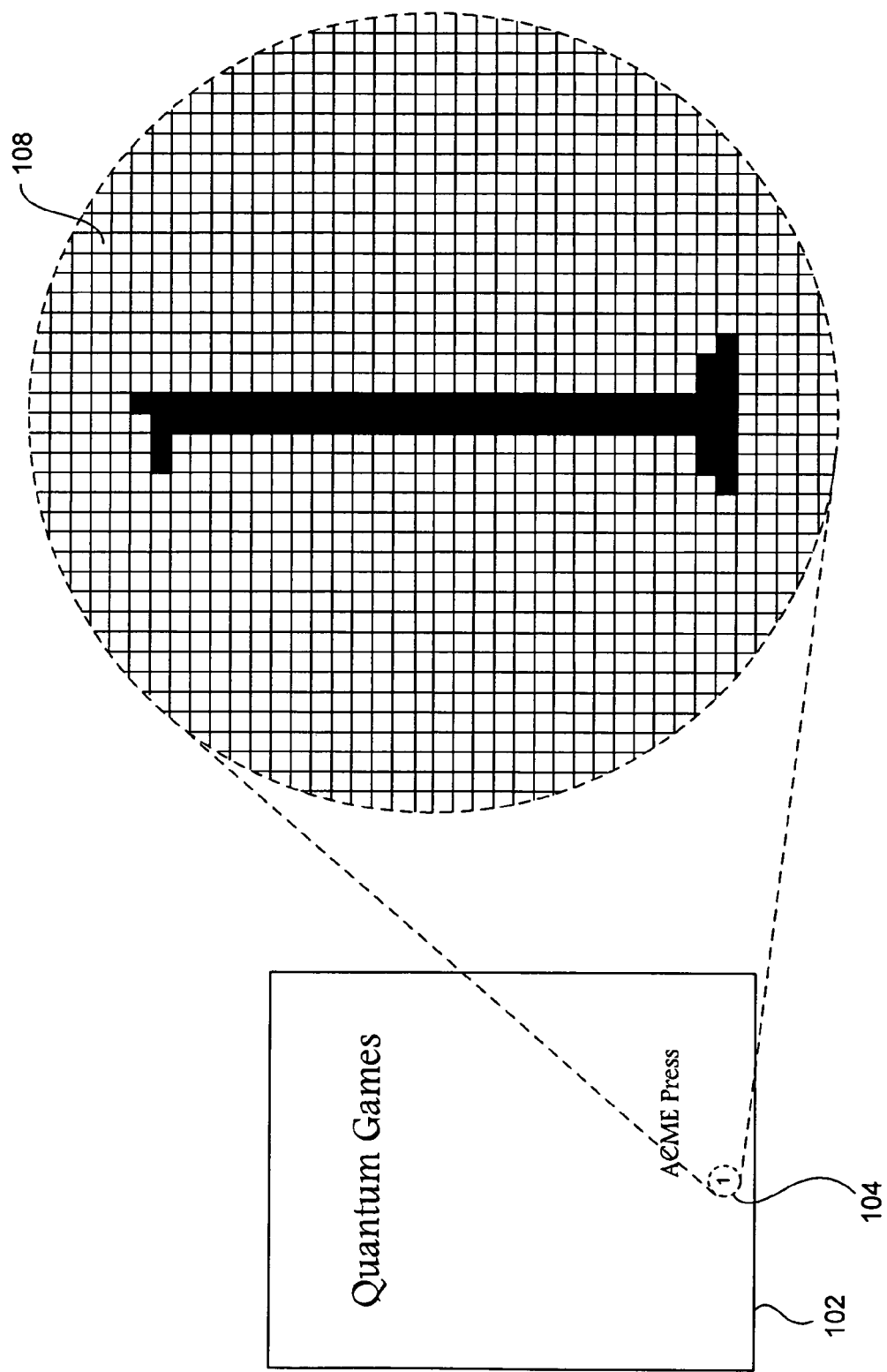
FIG. 1 illustrates digital encoding of a printed document to produce a clean image signal.

FIG. 1 illustrates digital encoding of a printed document to produce a clean image signal. In FIG. 1, a displayed image 102 of a digitally encoded title page is shown, with a small disk-like region 104 of the displayed document shown at a higher magnification 106. The document is displayed as an array of square pixels, such as pixel 108, and the digital encoding of the document comprises a sequence of integers, each integer representing an intensity value of a corresponding pixel. Commonly, for multi-level document images, pixel values range over a grayscale range from 0, indicating black, to 255, indicating white, with a continuous range of intermediate gray tones encoded by the integers 1-254. The integers 0-255 can therefore be considered to be symbols of a 256-symbol alphabet. Different techniques may be used to encode colored images. In one technique, three different grayscale-like encodings are used to encode intensity values of three primary colors, and the three different encodings are simultaneously displayed or rendered by a three-primary-color display or rendering device. Alternatively, a larger range of integer values may be used to encode a full range of color and intensity values in a single integer field. Thus, a pixel corresponds to a small region of a displayed or printed image, and the integer value associated with a pixel in a digitally encoded image represents the intensity, or both the color and intensity, for display or rendering of the pixel on a display or rendering device.

Figure 2:
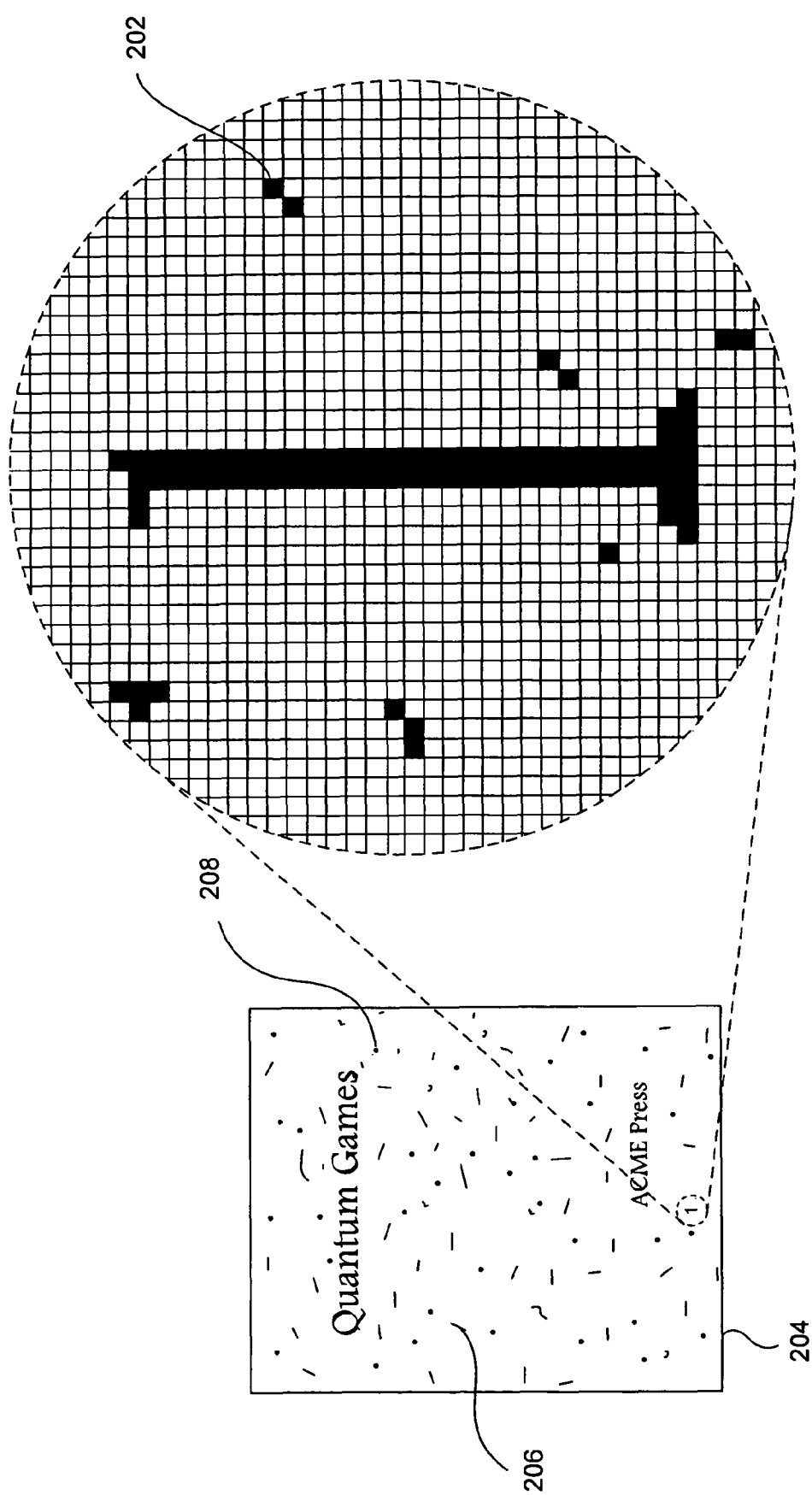
FIG. 2 illustrates a noisy signal corresponding to the clean image signal discussed with reference to in FIG. 1.

A printed document that is to be scanned by a scanning device can be considered as a clean signal. In other words, the printed document can be viewed as a large set of pixel-intensity values that, when displayed or printed, would appear visually indistinguishable from the original, printed document. The pixel data actually obtained as a result of scanning may be considered to be a noisy signal. FIG. 2 illustrates a noisy signal corresponding to the clean image signal discussed with reference to in FIG. 1. In comparing FIG. 2 to FIG. 1, it is easily observed that a number of pixels, such as pixel 202, have intensity values different from the values that the pixels would be expected to have based on the original, clean image shown in FIG. 1. The corresponding noisy image 204 is seen to have a number of visually discernable distortions, such as streaks 206 and speckles 208. In a scanning application, the original document represents the clean image signal, and the digitally encoded document produced by scanning the original document represents the noisy image signal. In various other applications, the clean signal may be an initial, digitally encoded document or other information source, and the noisy signal may be the corresponding digitally encoded document or other information source received following transmission of the clean signal through a communications medium or retrieved following storage of the clean signal in a volatile or non-volatile electronic data-storage device.

Figure 3A:
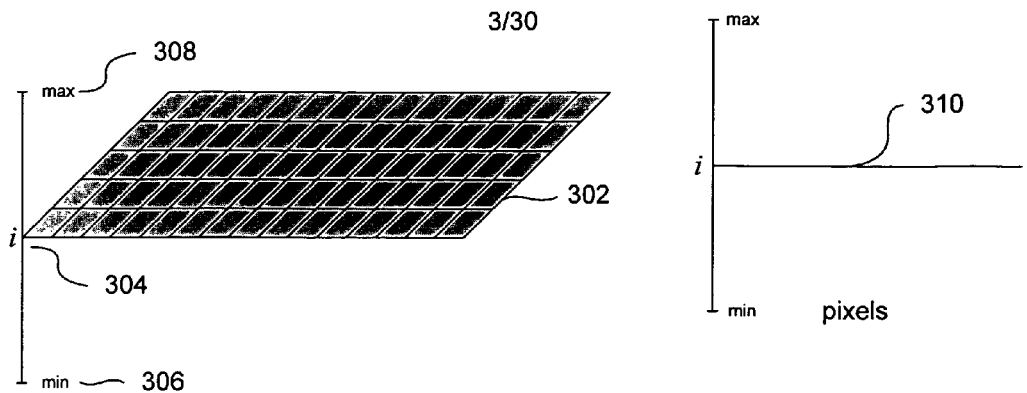
FIGS. 3A-C illustrate salt-and-pepper noise and Gaussian noise.
Figure 3B:
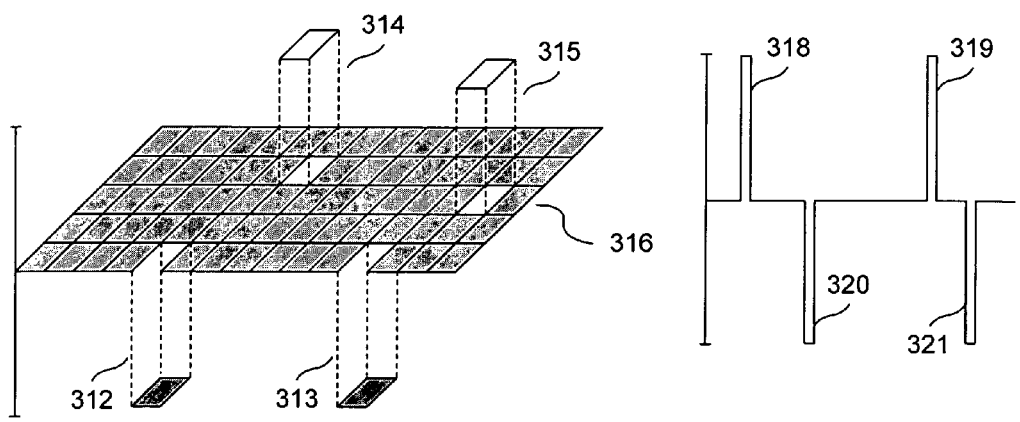
Figure 3C:
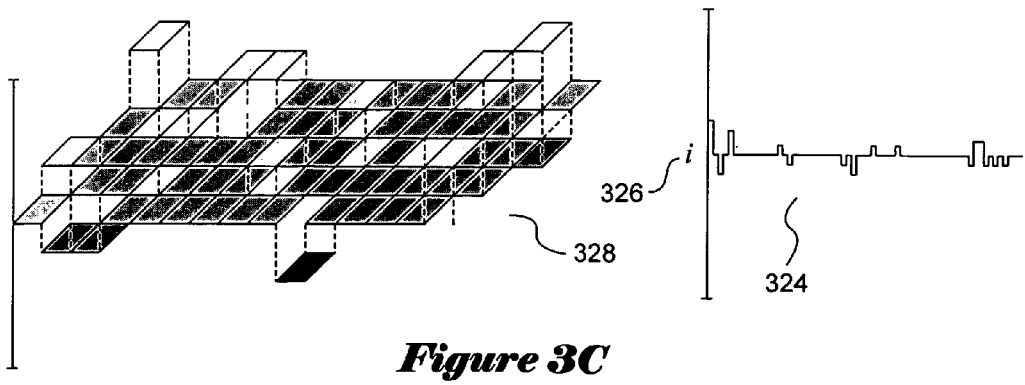

FIGS. 3A-C illustrate salt-and-pepper noise and Gaussian noise. FIG. 3A shows a small portion of a digitally encoded image 302, all pixels of which have a uniform intensity value i 304 with respect to a range of pixel-intensity values from a minimum value 306 to a maximum value 308. A two-dimensional graph of the intensity values of individual pixels from the region, in which pixels are taken in some particular linear order from the two-dimensional image, produces a straight, horizontal line 310. FIG. 3B illustrates salt-and-pepper noise added to the small region of uniform pixel intensity shown in FIG. 3A. Salt-and-pepper noise can be modeled as independent probabilities, associated with each pixel, that the intensity value associated with the pixel is altered, or corrupted, by a noisy channel to have either a minimum intensity value or a maximum intensity value. In FIG. 3B, two pixels 312-313 have intensity values altered to the minimum intensity value and two pixels 314-315 have intensity values altered to the maximum intensity value. A two-dimensional graph of the pixel intensity values for the pixels of the small region 316 of an image with added salt-and-pepper noise is seen to exhibit a number of narrow spikes 318-321 corresponding to pixels with altered, or corrupted, intensity values. FIG. 3C illustrates Gaussian noise added to the small region of uniform pixel intensity shown in FIG. 3A. Gaussian noise may be modeled as the addition of a value of an independent Gaussian random variable, associated with each pixel, to the pixel intensity value of the pixel. In one convenient mathematical model, the Gaussian random variables are considered to be independent, and to be identically distributed. Actual Gaussian-like noise produced by various types of noisy channels may not exhibit independent and identical distributions of alterations in pixel intensities, but a model employing independent and identically distributed Gaussian random variables often serves as a reasonable approximation for different types of Gaussian-like noise, and provides a tractable and computable mathematical framework for analysis of the noise. A two-dimensional graph of the pixel intensity values of the small region of an image shown in FIG. 3A with added Gaussian noise shows random fluctuations 324 about an expected pixel intensity i 326 for the small region of the image 328.

A discrete universal denoiser for continuous-tone images ("DUDE-CTI") has been developed for general denoising of digitally encoded images, and other noisy data. The DUDE-CTI method is next described, to establish a conceptual framework for the following description of the present invention.

Figure 4A:
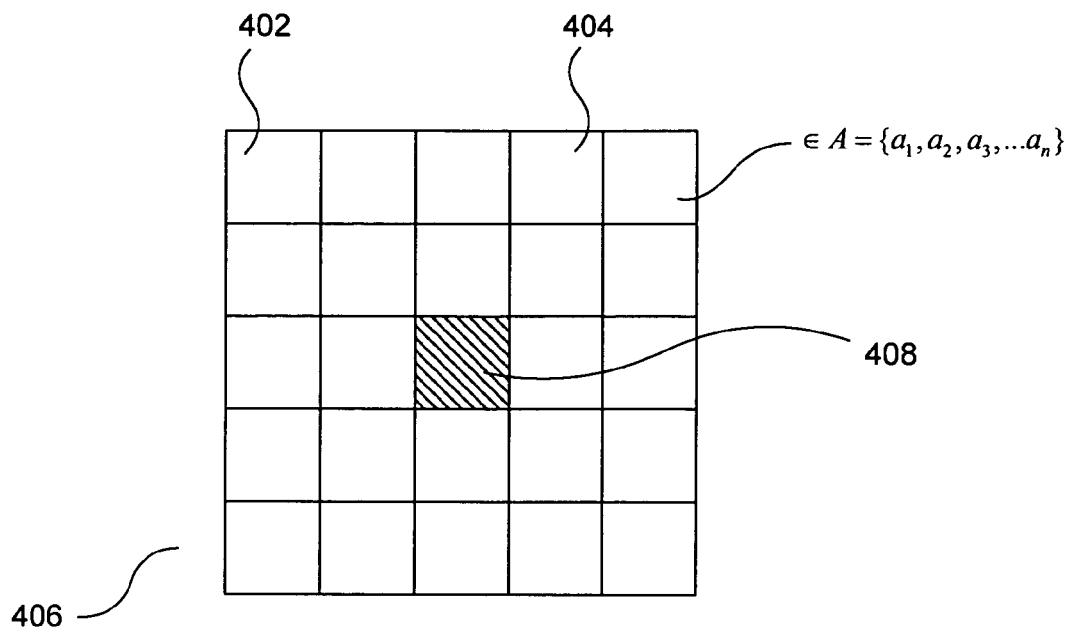
FIGS. 4A-B illustrate two different, well defined context neighborhoods that may be employed during analysis and denoising of image signals.
Figure 4B:
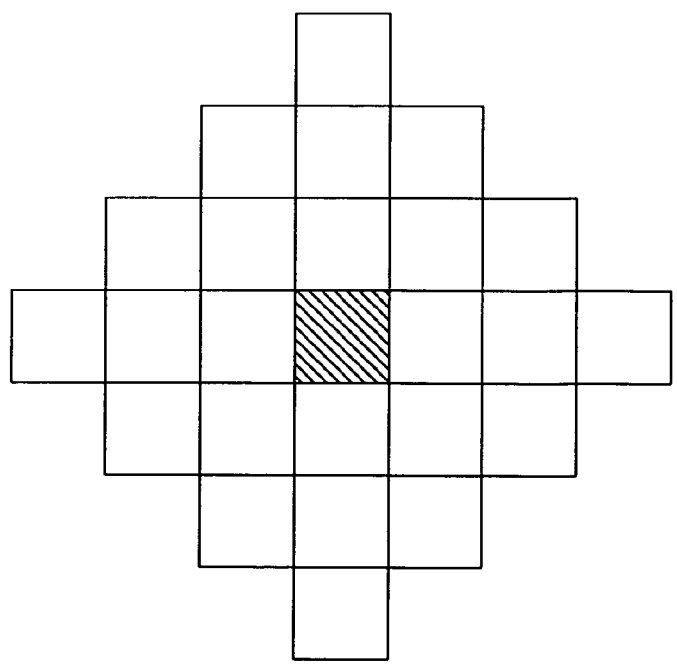

In the DUDE-CTI method, an image signal, or digitally encoded image, is considered to be a two-dimensionally-ordered sequence of symbols, each symbol mapped to one of a finite set of numerical values. Most of the symbols in a signal have well-defined two-dimensional contexts, or neighborhoods, and these contexts play a significant role in the DUDE-CTI method. FIGS. 4A-B illustrate two different, well defined contexts that may be employed during analysis and denoising of image signals. Each square, such as square 402 in FIG. 4A, represents a single pixel intensity value within an image signal. As shown in FIG. 4A, the pixel intensity value associated with a pixel, such as the pixel intensity value associated with pixel 404, is considered during analysis and denoising as a symbol $z_i$ chosen from a finite alphabet $A \equiv \{a_1, a_2, a_3, \ldots a_n\}$ where the index i indicates the order, or position, of the pixel within the signal. The pixel intensity value, or symbol $z_i$, associated with pixel i may be any one of the symbols in alphabet A. For common encodings of multi-level images, the symbols in A, $\{a_1, a_2, a_3, \ldots a_n\}$, are the unsigned, single byte values 0, 1, . . . , 255. In each of several passes, the DUDE-CTI and the near-optimal linear denoisers of the present invention consider each symbol within a signal with respect to the symbol's context. The context 406 shown in FIG. 4A for a currently considered pixel, or central symbol, 408 comprises the pixel values contained in a 5×5 square region surrounding the currently considered pixel 408, but not including the currently considered pixel. In other words, the context for symbol 408 comprises the values of the 24 nearest symbol neighbors within the image signal containing currently considered symbol 408. In the discussion of the DUDE-CTI denoiser, the currently considered symbol, such as symbol 408 in FIG. 4A, is referred to as the "central symbol" of the context surrounding the symbol, but the context is not considered to include the central symbol.

Many different context shapes and sizes are possible. FIG. 4B shows an alternative 24-symbol context for an image signal. In general, the useful information content per symbol of a context may increase with increasing size up to a context size of maximum useful information per symbol, and then decrease with context sizes greater than the context size of maximum useful information per symbol. Analysis and denoising of noisy signals involves frequent context-based computations, with execution times increasing with increases in the context size employed in the analysis. Therefore, efficiency constraints may constrain context sizes to sizes, in symbols, below the maximum useful information per symbol size. Moreover, the maximum useful information per symbol context size may vary with the image signals being denoised.

FIGS. 5A-D illustrate context usage during analysis and denoising of noisy signals. In FIG. 5A, the uppermost and leftmost symbol 502 with a full, 3×3 symbol context 504 within a small, square image 506 is shown. In certain types of analysis and denoising, special contexts are used for edge symbols, such as the first and last symbols of each row and column of the image. In other techniques, including the technique illustrated in FIGS. 5A-D, only symbols with full contexts are analyzed. FIGS. 5B and 5C show the 3×3 contexts 508 and 509 around the next rightmost symbol 510 and the next lowest symbol 512 with respect to symbol 502 in FIG. 5A. As shown in FIG. 5D, a given pass, or stage, of analysis or denoising may involve successive consideration of each full-context symbol within an image signal, starting with a first symbol 502 and proceeding to a final symbol 514. In FIG. 5D, small arrows, such as arrow 516, indicate each step of a pass in which each symbol is considered. In alternate techniques, all of the symbols within a signal may be considered, with specialized asymmetrical contexts employed for those symbols lacking a full context, or neighborhood.

Images are generally 2-dimensional data sets, and analysis and denoising methods for images therefore frequently use 2-dimensional contexts symmetrically disposed with respect to the central symbol. In other types of data sets, other types of contexts may be appropriate. For example, in digitally encoded text files, comprising essentially a one-dimensional series of symbols, a single length of symbols that include the central symbol may be employed as a context. Other types of signals may profitably employ more complex, non-contiguous or hyperdimensional contexts.

Figure 6:
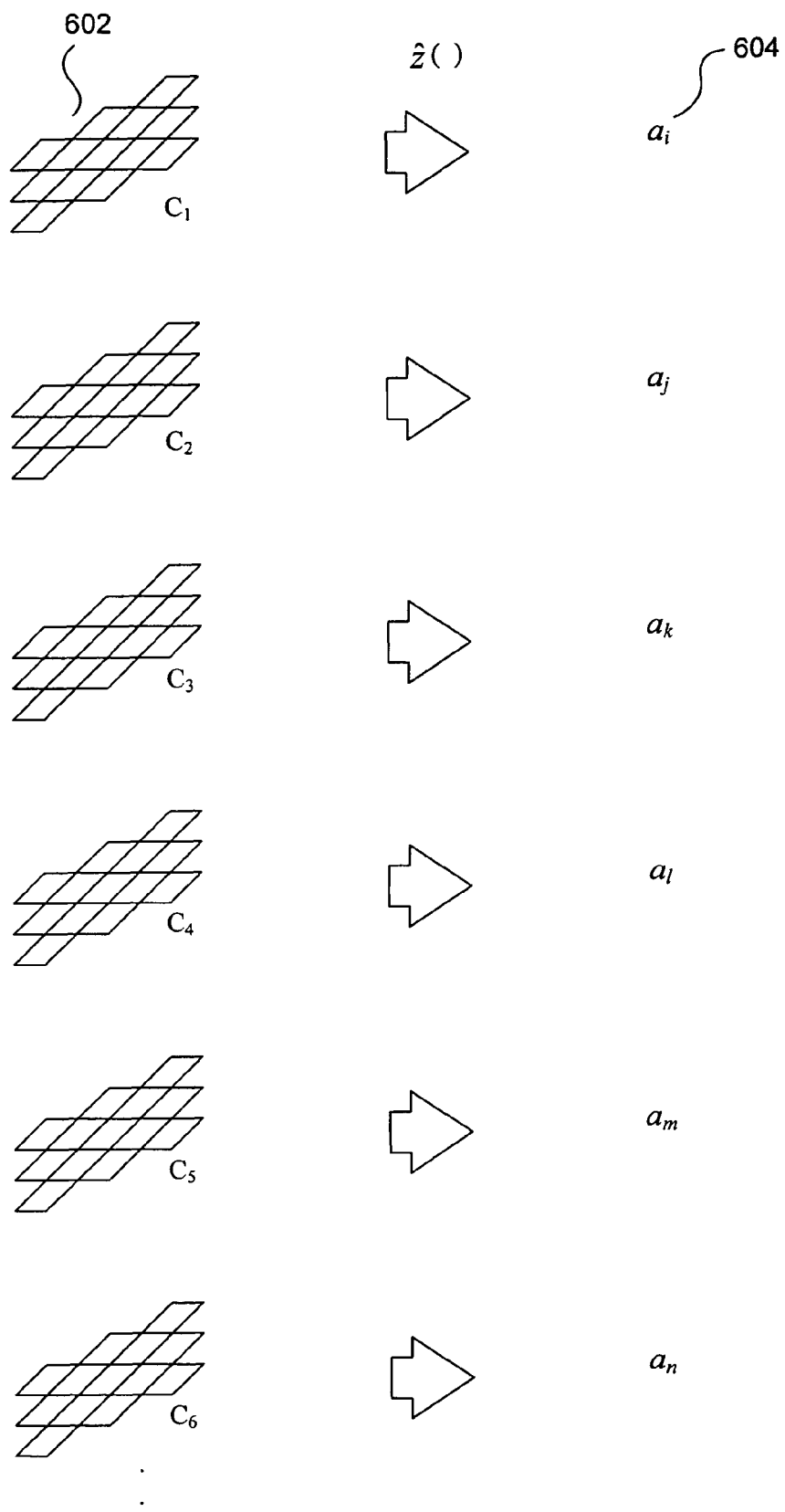
FIG. 6 illustrates the predictor function $\hat{z}(\ )$.

The DUDE-CTI method employs a central-symbol predictor function $\hat{z}(\ )$. FIG. 6 illustrates the predictor function $\hat{z}(\ )$. As illustrated in FIG. 6, the $\hat{z}(\ )$ function receives, as a sole argument, a context, such as context $C_1$ 602 in FIG. 6, from a noisy signal and returns a symbol 604 predicted to be the central noisy symbol. In other words, as shown in FIG. 6, for each possible context $C_1, C_2, C_3, \ldots$ that may occur in a noisy signal, the predictor functions $\hat{z}(\ )$ returns a corresponding central symbol for the context.

Figure 7:
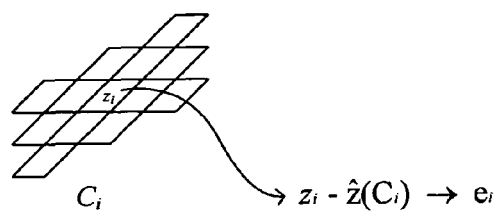
FIG. 7 illustrates computation of an error $e_i$ for a symbol $z_i$ observed within a context $C_i$ in noisy signal.

The DUDE-CTI method computes an error $e_i$ for each symbol $z_i$ in the noisy signal as the difference between the observed symbol $z_i$ and the symbol predicted by the predictor function $\hat{z}(\ )$ for the context $C_i$ for the symbol $z_i$. FIG. 7 illustrates computation of an error $e_i$ for a symbol $z_i$ observed within a context $C_i$ observed in a noisy signal.

Figure 8:
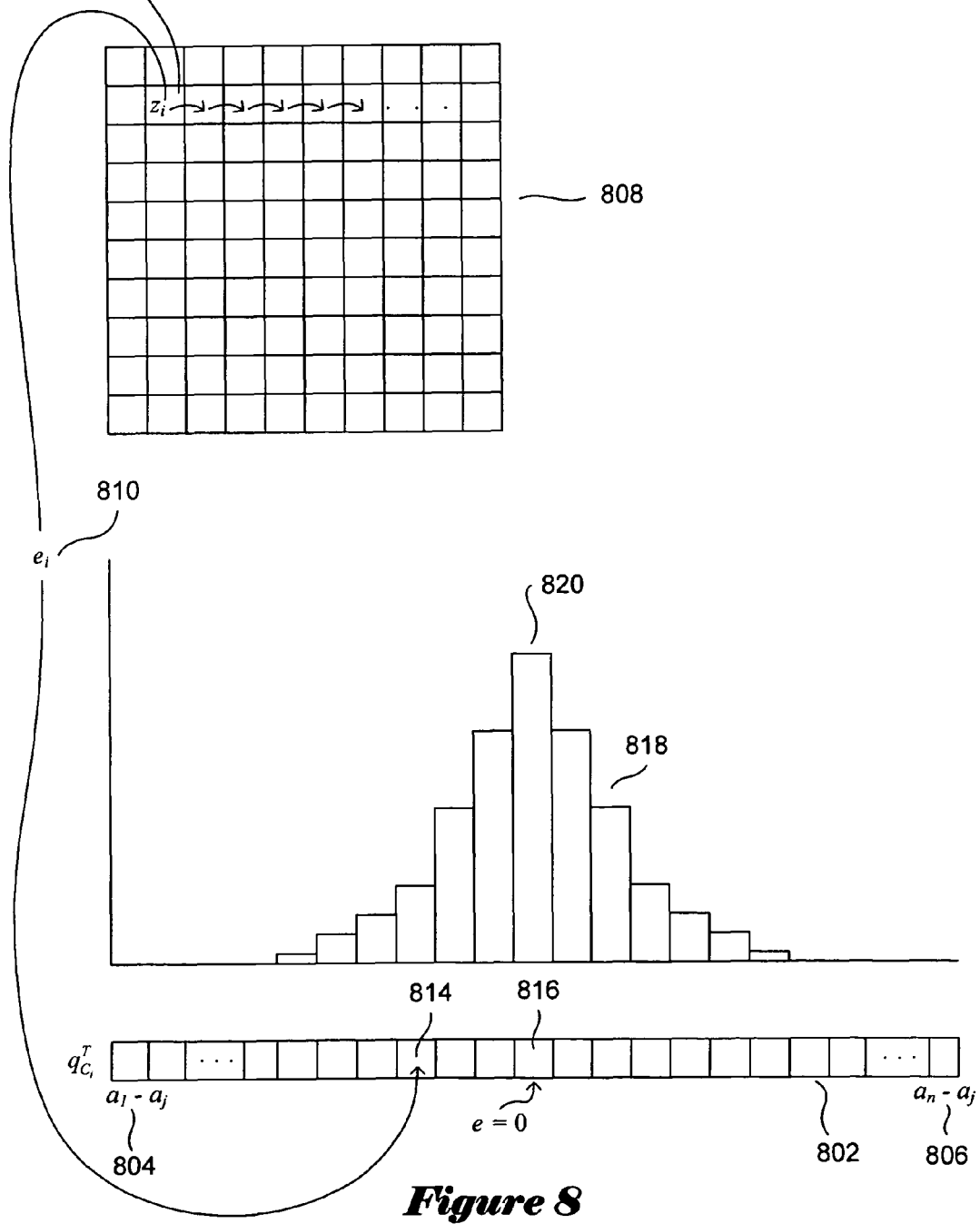
FIG. 8 illustrates accumulation of error information for a particular context during analysis of a noisy image signal.

FIG. 8 illustrates accumulation of error information for a particular context during analysis of a noisy image signal. The error-information accumulation in FIG. 8 is context specific. As discussed later, more efficient DUDE-CTI implementations use cluster-specific error-information accumulation. As shown in FIG. 8, a data structure, or vector, $q_{C_i}^T$ 802 is maintained for each possible context $C_i$ in order to count the occurrences of different possible error values computed for the context $C_i$ during analysis of a noisy image signal. If the predictor function $\hat{z}(C_i)$ predicts the symbol $a_j$ for context $C_i$, then, according to the error equation $e_i = z_i - \hat{z}(C_i)$, the error values that can be computed for context $C_i$ range from $a_1 - a_j$ 804 to $a_n - a_j$ 806.

In a first pass of the DUDE-CTI denoiser, each symbol in a noisy image signal 808 is considered, and the error for each considered symbol is tabulated in the appropriate vector $q_C^T$ for that symbol. For example, in FIG. 8, an error $e_i$ 810 is computed from the first considered symbol $z_i$ 812 and associated context $C_i$, and the computed error $e_i$ is used to compute the position of a counter 814 within the vector $q_{C_i}^T$ 802 that is updated to reflect the occurrence of error $e_i$ in the noisy image signal 808. The computed error $e_i$ 810 can be viewed as being offset from a counter 816 within the vector $q_{C_i}^T$ 802 corresponding to a computed error of 0. As each symbol is considered during the first pass of the DUDE-CTI method, the vector $q_C^T$ corresponding to the observed context of the symbol is updated to reflect the occurrence of the error e computed from the symbol and context observed for the symbol within the noisy image signal. After the first pass of the DUDE-CTI method, each vector $q_C^T$ generally stores a histogram more or less symmetrically disposed about the counter within the vector $q_C^T$ corresponding to a computed error value e of 0. For example, in FIG. 8, the contents of the counters within vector q 802 are plotted above the vector $q_{C_i}^T$ in a two-dimensional plot 818, and form a histogram with a central, highest peak 820 corresponding to the counter 816 within vector $q_{C_i}^T$ 802 representing a computed error of 0. In other words, the symbol predicted by the predictor function z( ) for a given context $C_i$ is generally the symbol most often observed within the context $C_i$ in the noisy signal. Thus, following the first pass of the DUDE-CTI denoiser method, histograms of observed errors for each context are collected.

Unfortunately, when contexts of even modest size are used, a typical image will not contain a sufficient number of occurrences of each context to collect reliable, well-formed histograms of error occurrences, such as the histogram shown in FIG. 8. For this reason, the DUDE-CTI method employs context clustering in order to collect sufficient numbers of error occurrences for each context.

Figure 9:
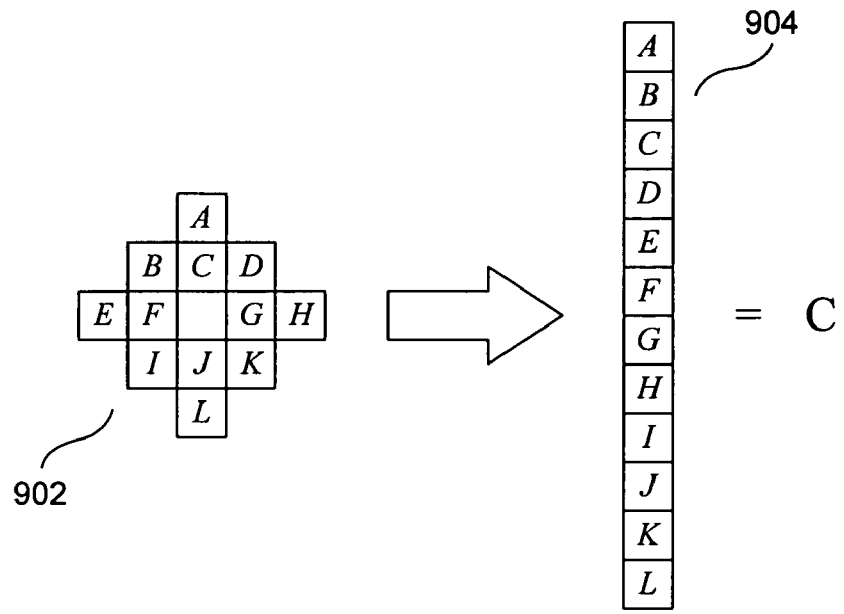
FIG. 9 illustrates a context vector.

FIG. 9 illustrates a context vector. It is convenient to consider context vectors for the mathematical steps of the DUDE-CTI method. As shown in FIG. 9, the symbols that occur within a context 902 may be linearly ordered into a vector 904 according to some linear ordering method that is uniformly applied to all contexts. In FIG. 9, symbols A-L from 2-dimensional context 902 are re-ordered into a column vector 904 by a left-to-right, top-down traversal of the 2-dimensional context 902. The linear ordering method is arbitrary, and different linear ordering methods may be mathematically or programmatically convenient for different types of contexts. A context vector may be considered to be a row vector or a column vector, depending on conventions chosen for the analysis using the context vector. In other words, the convention is arbitrary.

Figure 10:
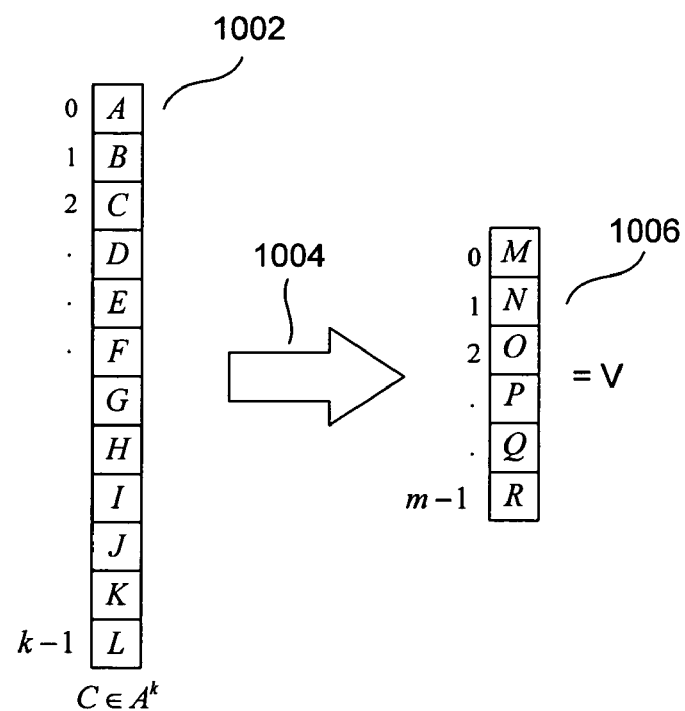
FIG. 10 illustrates a context-vector to cluster-index mapping.

Context clustering can be thought of as a many-to-one mapping, or binning, of context vectors in a context-vector space into a set of context-cluster indices. FIG. 10 illustrates a context-vector to cluster-index mapping. In FIG. 10, a context vector 1002 $C \in A^k$ of dimension k is mathematically transformed 1004 to a cluster index V 1006 with a range of values expressible using a sequence of m symbols over some alphabet (e.g. binary), where m is less than the dimension k of the context vector.

Figure 11:
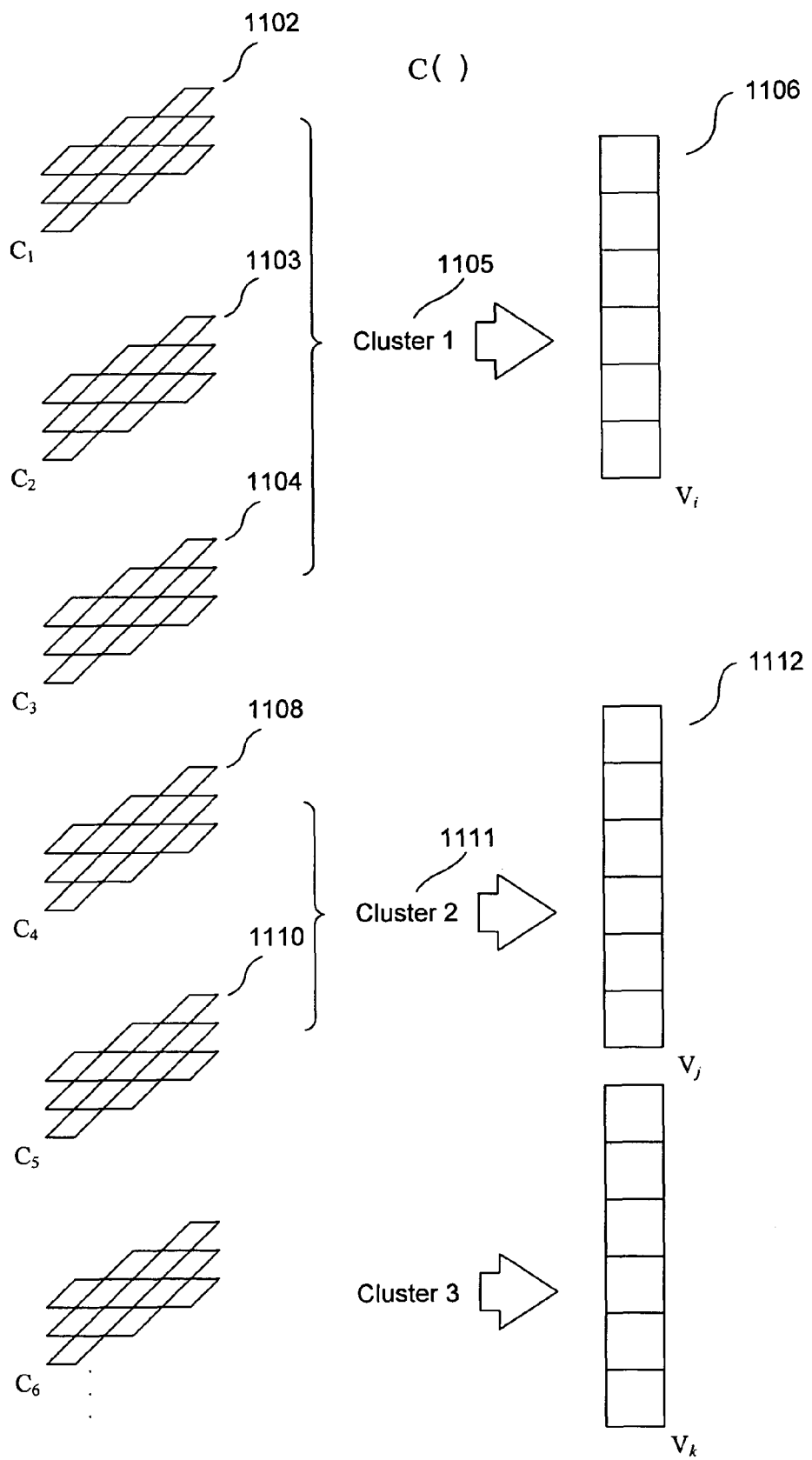
FIG. 11 illustrates a context-clustering function $C(\ )$ used by various embodiments of the DUDE-CTI denoising method.

FIG. 11 illustrates a context-clustering function C( ) used by various embodiments of the DUDE-CTI denoising method. As shown in FIG. 11, the context-clustering function C( ) maps a given context, supplied as a sole argument, that is expected to produce a particular type of error histogram to a particular cluster to which other contexts that are expected to produce similar error histograms may be mapped. The context is, in turn, mapped to a cluster index. Multiple contexts are generally mapped to any given cluster by the context-clustering function C( ). For example, in FIG. 11, three contexts 1102-1104 are mapped by the context-clustering function C( ) to Cluster 1 1105, in turn mapped to, or associated with, cluster index $V_i$ 1106. Similarly, contexts 1108 and 1110 are both mapped by the context-clustering function C( ) to Cluster 2 1111, in turn mapped to, or associated with, cluster index $V_j$ 1112. The number of contexts mapped to any particular cluster may vary, depending on the context-clustering function C( ). Any particular DUDE-CTI embodiment may use any of a number of different context-clustering functions, although suitable context-clustering functions generally have the property of mapping contexts expected to produce similarly shaped error histograms, such as the error histogram shown in FIG. 8, to a common cluster. In other words, all the contexts mapped to any particular cluster by a suitable context-clustering function would produce similarly shaped error histograms were the first pass of the DUDE-CTI method executed on a sufficiently large noisy image signal to collect sufficient occurrence counts of errors for each context to generate well-formed histograms for each context.

Figure 12:
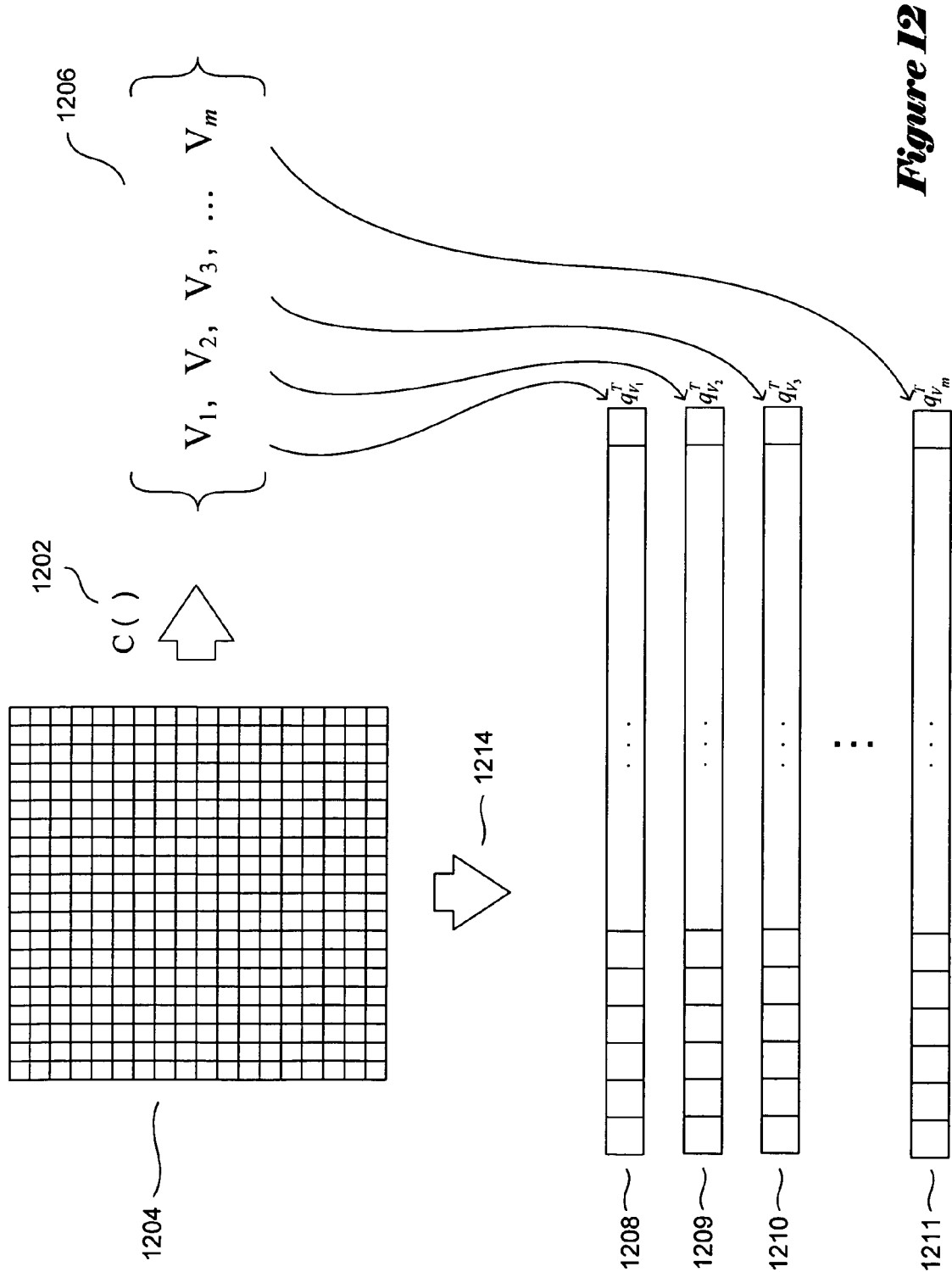
FIG. 12 illustrates the use of clustering by the DUDE-CTI method during a first pass, in which error histograms are prepared.

FIG. 12 illustrates the use of clustering by the DUDE-CTI method during a first pass, in which error histograms are prepared. As shown in FIG. 12, a context-clustering function C( ) 1202 is employed to map contexts occurring within a noisy image signal 1204 to a set of clusters 1206. Then, an occurrence-count vector $q_{V_i}^T$ 1208-1211 is instantiated and initialized for each possible cluster $V_i$. Finally, each symbol in the noisy image signal 1204 is analyzed 1214 in the first pass to compute and tabulate the occurrence of computed errors, on a cluster-by-cluster basis. The errors are computed as discussed above, with reference to FIGS. 7 and 8, except that all errors observed for all contexts that belong to a given cluster $V_i$ are commonly tabulated together in the vector $q_{V_i}^T$ for that cluster, rather than being separately tabulated in context-associated vectors $q_C^T$, as was done in FIG. 8. Thus, clustering allows a much larger number of error occurrences to be tabulated together in each histogram generated during analysis of a given noisy image signal. However, common tabulation of error occurrences in cluster-associated vectors $q_V^T$ is only meaningful if the shapes of the error histograms that would be separately produced for all contexts associated with the cluster are similar.

Figure 13:
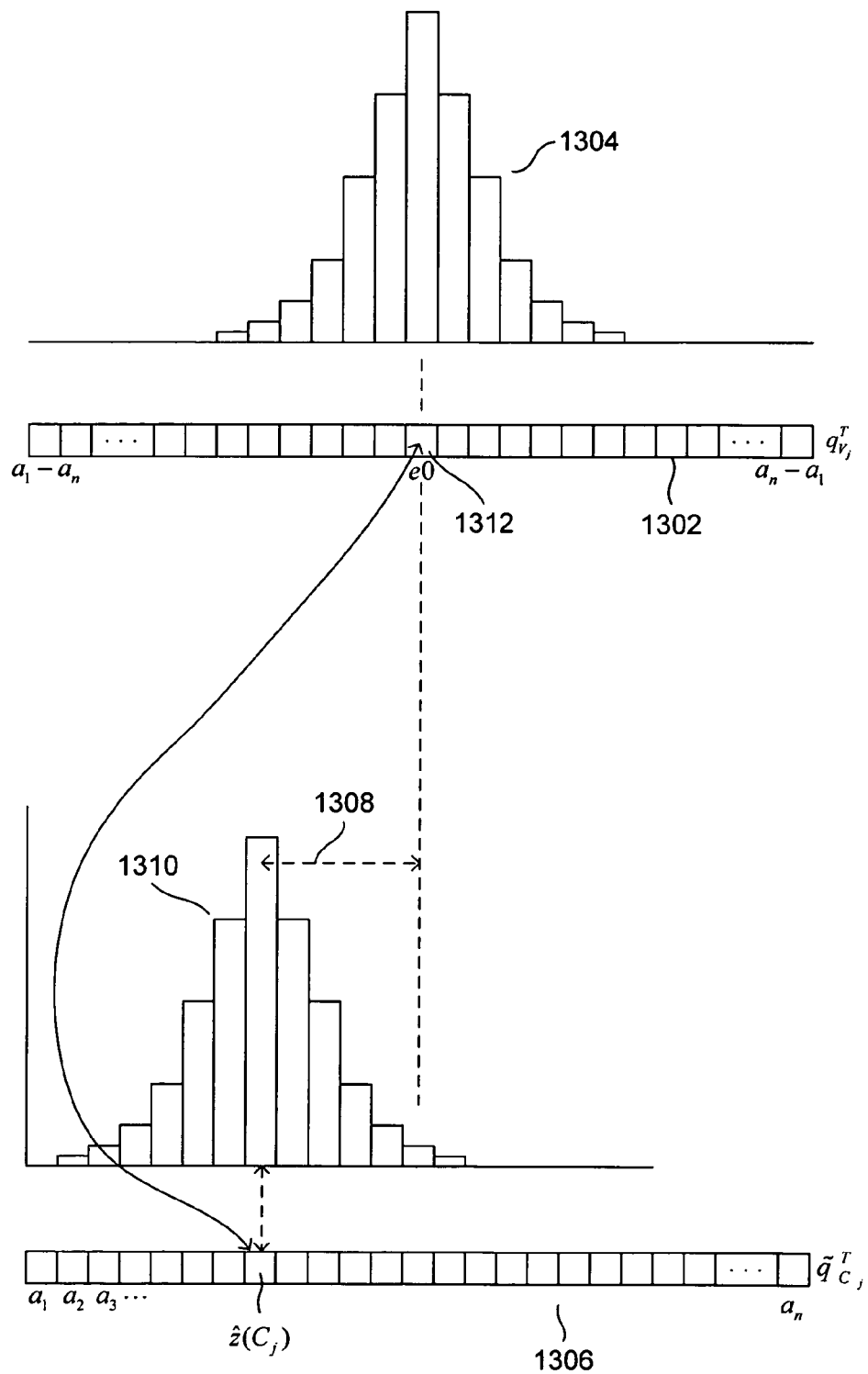
FIG. 13 illustrates generation of context-specific symbol-occurrence probability distributions $q_C^T$ from cluster-associated error-occurrence vectors $q_V^T$ collected during the first pass of a cluster-based DUDE-CTI method.

FIG. 13 illustrates generation of context-specific symbol-occurrence probability distributions $\tilde{q}_C^T$ from cluster-associated error-occurrence vectors $q_V^T$ collected during the first pass of a cluster-based DUDE-CTI method. In FIG. 13, a cluster-associated error-occurrence vector $q_{V_j}^T$ 1302 is shown at the top of the diagram, along with a histogram plot 1304 of the values stored in the counters within the cluster-associated vector $q_{V_j}^T$, using the illustration convention employed in FIG. 8. A context-specific symbol-occurrence probability distribution $\tilde{q}_{C_j}^T$ for a context $C_j$ associated with cluster $V_j$ 1304 is generated in FIG. 13 by copying the contents of the cluster-associated error-occurrence vector $q_{V_j}^T$ 1302 into the counters of context-associated context-specific symbol-occurrence probability distribution $\tilde{q}_{C_j}^T$. However, rather than copying the error-occurrence counts from cluster-associated vector $q_{V_j}^T$ into corresponding counters of context-associated context-specific symbol-occurrence probability distribution $\tilde{q}_{C_j}^T$, each copy involves an offset 1308, so that the context-specific probability distribution 1310 is centered about the symbol value $\hat{z}(C_j)$ predicted by the predictor function for the context, rather than centered at the position 1312 corresponding to a computed error of 0 in the cluster-specific histogram 1304. In other words, the final, context-specific vector $\tilde{q}_{C_j}^T$ represents a probability distribution for the occurrences of symbols $a_1, a_2, \ldots a_n$ from the alphabet A for all occurrences of the context $C_j$ in the noisy image signal, estimated from the probability distribution observed for the cluster to which the context is mapped by the context-clustering function C( ). The copy operation may therefore be accompanied by a normalization, to provide a normalized, estimated probability distribution, and a domain-related adjustment, since the domain of $q_{V_j}^T$ is generally twice as large as the symbol alphabet size n, which is the domain of $\tilde{q}_{C_j}^T$. Thus, the error-occurrence counts tabulated in common for each cluster are used to generate specific symbol-occurrence probability distributions $\tilde{q}_{C_j}^T$ for each context $C_j$.

Next, the DUDE-CTI denoiser generates a function g(C, z) that computes a replacement symbol $\hat{x}$ for a given central symbol z that occurs within context C observed in the noisy image signal. The replacement function g( ) can then be used in a second, symbol-by-symbol pass, to replace each symbol in the noisy image signal with a corresponding replacement symbol. The symbol replacement for each symbol in the noisy image signal is carried out independently. In other words, the contexts applied to the replacement function g( ) are the contexts observed in the noisy image signal, rather than partially symbol-replaced contexts. It should be noted that, in many cases, the replacement symbol $\hat{x}$ is identical to the corresponding observed symbol z in the noisy image signal.

Computation of the replacement function g( ) involves use of two matrices: (1) a matrix $\Pi$ that represents a channel-noise model for the noise-inducing channel that generates symbol differences between the initial, clean image signal and the noisy image signal; and (2) a distortion matrix $\Lambda$ that represents the distortions in a recovered image produced by substituting for symbol $a_i$ in the corresponding clean image signal any of the symbols $a_1, a_2, \ldots a_n$, in alphabet A.

Figure 14:
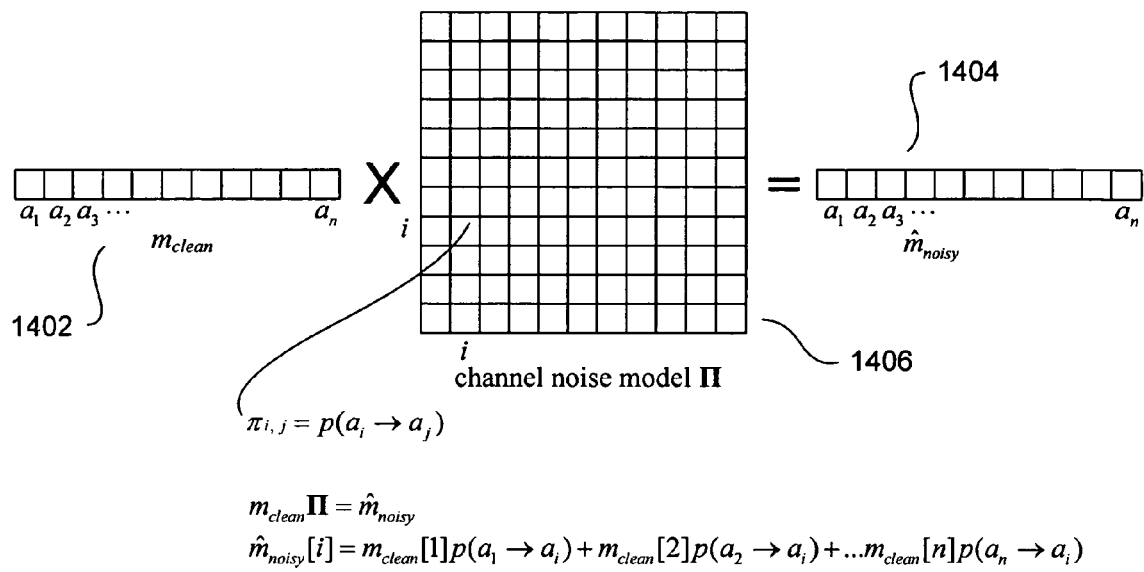
FIG. 14 illustrates a channel-noise-model matrix Π.

FIG. 14 illustrates a channel-noise-model matrix $\Pi$. In FIG. 14, the row vector $m_{clean}$ 1402 contains counts of the occurrences of each symbol in alphabet A within the clean, original image signal. The row vector $m_{clean}$ is indexed by symbols from the alphabet A, $a_1, a_2, a_3, \ldots$ A corresponding row vector $m_{noisy}$, contains the counts of occurrences of the symbols of the alphabet A in the noisy image signal. Multiplication of the row vector $m_{clean}$ by the channel-noise-model matrix $\Pi$ 1406 produces a derived row vector $\hat{m}_{noisy}$ 1404. Each element $\pi_{i,j}$ of the channel-noise-model matrix $\Pi$ contains the probability of the transition of the symbol $a_i$ to the symbol $a_j$ as the clean signal passes through the noisy channel modeled by the channel-noise-model matrix $\Pi$. In mathematical terms:

$$m_{clean}\Pi = \hat{m}_{noisy}$$

$$\hat{m}_{noisy}[i] = m_{clean}[1]p(a_1 \to a_i) + m_{clean}[2]p(a_2 \to a_i) + \ldots + m_{clean}[n]p(a_n \to a_i)$$

The derived vector $\hat{m}_{noisy}$ 1404 is expected to be fairly close, relative to the signal size, to the vector $m_{noisy}$ containing counts of symbols observed in a noisy signal. Provided that the channel-noise-model matrix $\Pi$ is invertible, or an approximate or pseudo inverse of the matrix $\Pi$ can be obtained by any of a number of matrix inversion methods, an observed vector $m_{noisy}$ including the counts of occurrences of symbols observed in a noisy signal can be multiplied by the inverse of the channel-noise-model matrix $\Pi$ to produce approximate estimates of the probabilities of occurrences of symbols in the clean signal:

$$m_{clean} \cong m_{noisy}\Pi^{-1}$$

This approximation technique can be extended to vectors $\tilde{q}_{C_j}^T$ that include the derived probabilities of occurrences of symbols of the alphabet A observed in contexts $C_j$ in the noisy signal to produce estimates of probabilities of occurrence of symbols in the alphabet A in the clean signal corresponding to occurrences of the context $C_j$ in the noisy signal by multiplication of $\tilde{q}_{C_j}^T$ by the inverse of the channel-noise-model matrix $\Pi$, as follows:

$$\tilde{q}_{clean,C_j}^T \cong \tilde{q}_{C_j}^T \Pi^{-1}$$

Figure 15:
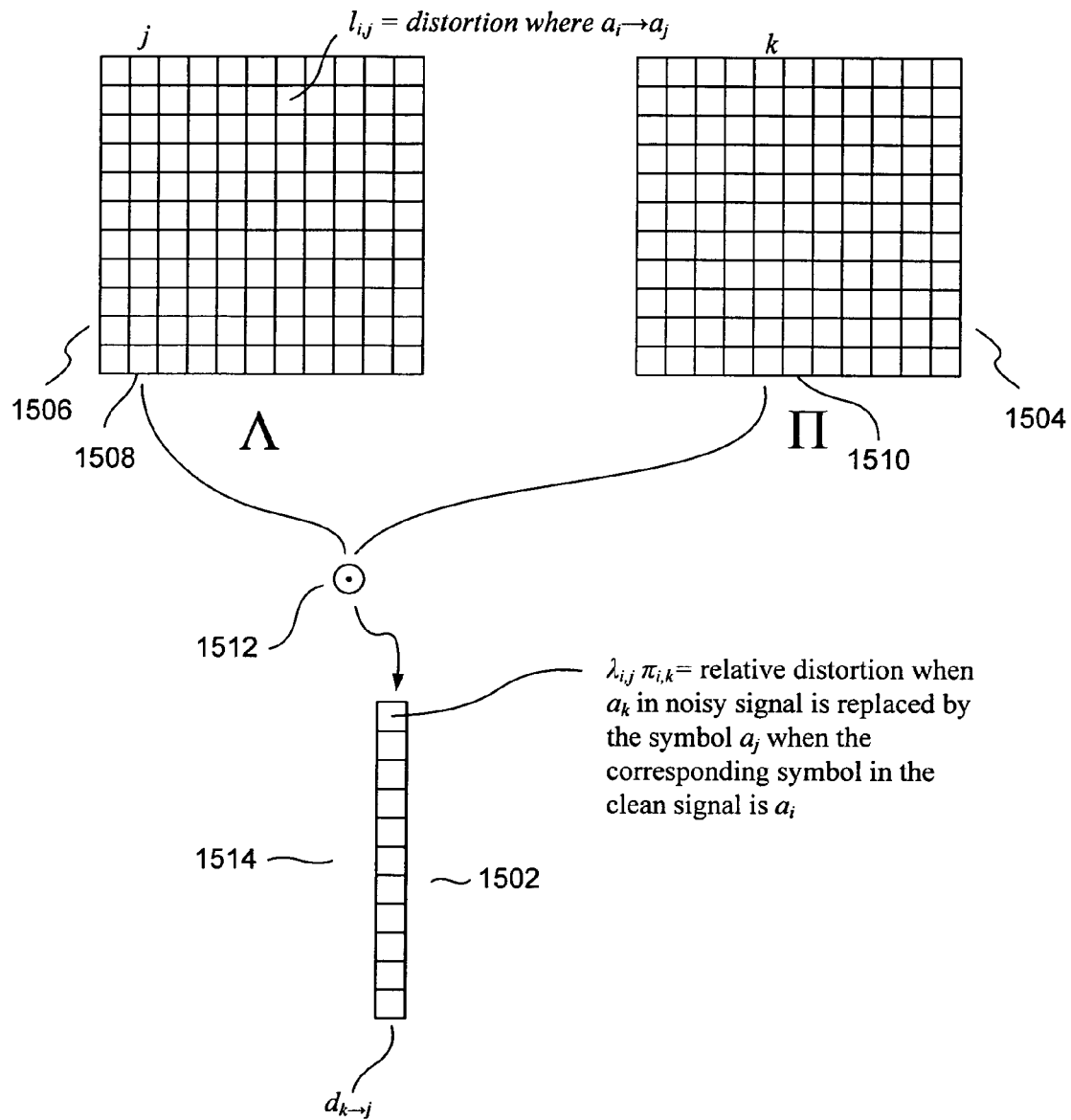
FIG. 15 illustrates construction of a relative distortion vector for replacement of a symbol $a_k$ in a noisy signal by a symbol $a_j$.

FIG. 15 illustrates construction of a relative distortion vector that numerically expresses the distortion expected from replacement of a symbol $a_k$ in a noisy signal by a symbol $a_j$. Construction of a relative distortion vector 1502 involves a column of the channel-noise-model matrix $\Pi$ 1504, discussed above with reference to FIG. 14, as well as a column from the distortion matrix $\Lambda$ 1506. Each element $\lambda_{i,j}$ in the distortion matrix $\Lambda$ contains a numerical estimate of the distortion produced in an image when the symbol $a_i$ in the clean signal is replaced by the symbol $a_j$ in the noisy signal. When a column j 1508 is selected from the distortion matrix $\Lambda$ and a column k is selected from the channel-noise-model matrix $\Pi$ 1510, and the selected columns $\lambda_j$ and $\pi_k$ are combined by the Schur product operation 1512, the distortion vector $d_{k \to j}$ 1514 is produced. The Schur product is carried out by the multiplication of each element in the column $\lambda_j$ by the corresponding element in the $\pi_k$ column. Each element of the distortion vector $d_{k \to j}, \lambda_{i,j}, \pi_{i,k}$, includes a numerical estimate of the relative distortion produced when symbol $a_k$ in a noisy signal is replaced by the symbol $a_j$ when the corresponding symbol in the clean signal is $a_i$.

FIG. 16 illustrates the computation of an estimate of the distortion produced by replacing symbol $a_k$ within context C in a noisy signal by the replacement symbol $a_j$. This distortion value is obtained by the inner product of the row vector $\tilde{q}_{clean,C}^T$ 1602 by the distortion column vector $d_{k \to j}$ 1604. Note that the row vector $\tilde{q}_{clean,C}^T$ is obtained, as discussed above, by multiplying the derived row vector $\tilde{q}_C^T$ by the inverse of the channel-noise-model matrix $\Pi$. Therefore, as shown in FIG. 16, a numerical estimate of the distortion produced by replacing the symbol $a_k$ within context C in a noisy signal by the symbol $a_j$ can be obtained entirely from the derived symbol occurrence frequencies within the noisy signal, the distortion matrix $\Lambda$, and the channel-noise-model matrix $\Pi$ and its inverse $\Pi^{-1}$.

FIG. 17 illustrates a symbol-replacement function g(C,z). The symbol-replacement function g(C,z) computes a replacement symbol for an observed central symbol z within an observed context C. The observed central symbol and context are supplied as arguments to the symbol-replacement function g(C,z). The function g( ) considers each possible replacement symbol value for the central symbol of the context C and returns the estimated minimally distorting replacement character $\hat{x}$, where, for a given observed central symbol z within an observed context C:

$$\hat{x} = g(C, z) \frac{\arg\min}{j = 1 \text{ to } n} (\hat{d}_{z \to a_j})$$

where, for $z=a_i$, $\hat{d}_{z \to a_j} = \hat{d}_{a_i \to a_j} = \tilde{q}_{clean,C}^T \cdot d_{i \to j}$ Thus, the symbol-replacement function g( ) produces a replacement character $\hat{x}$ for an observed central symbol z within a context C observed in the noisy signal.

EMBODIMENTS OF THE PRESENT INVENTION

Figure 18:
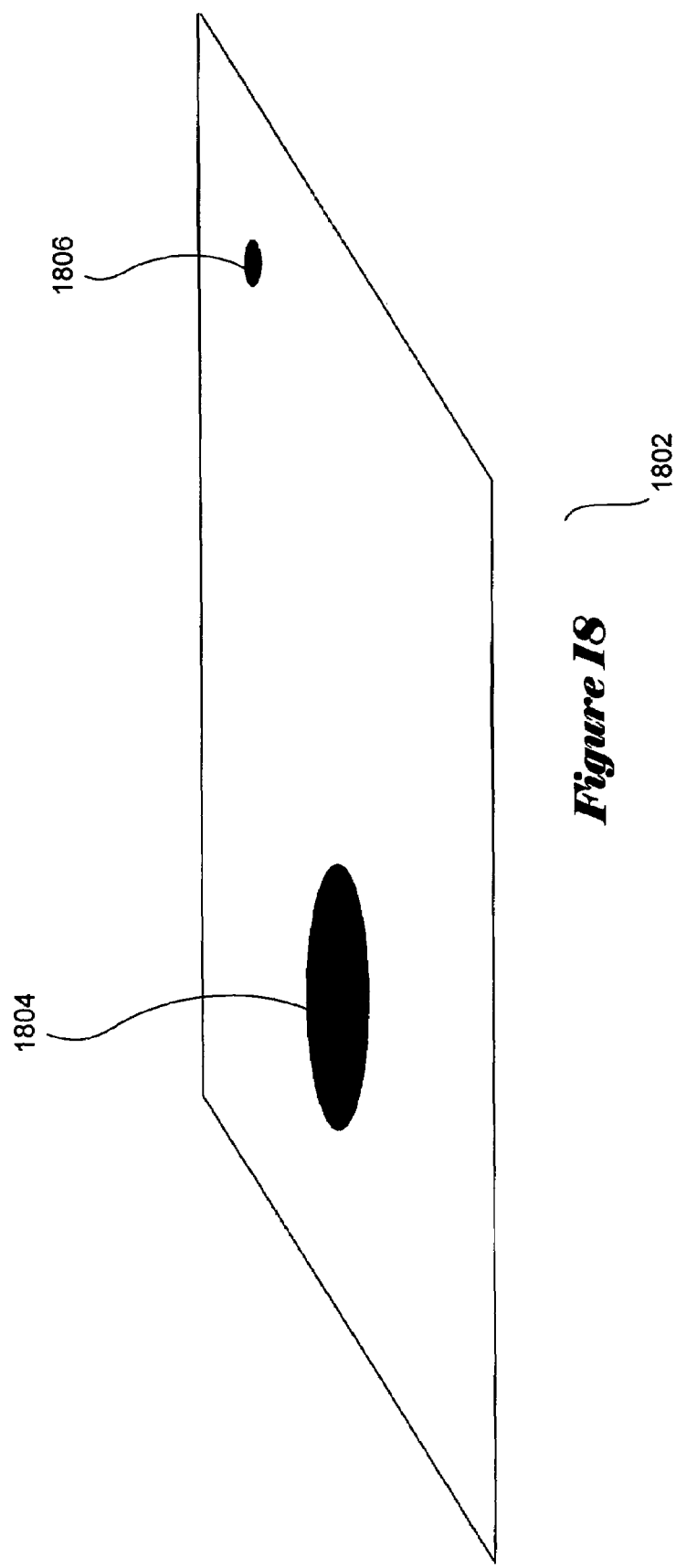
FIG. 18 illustrates a small portion of a text image comprising black text on a white background.

FIG. 18 illustrates a small portion of a text image comprising black text on a white background. The portion of the text image is shown as it might be perceived by a human reader. The small portion of the text image 1802 shown in FIG. 18 includes a period 1804 and a small speck, or blotch, 1806 that represents noise.

Figure 19:
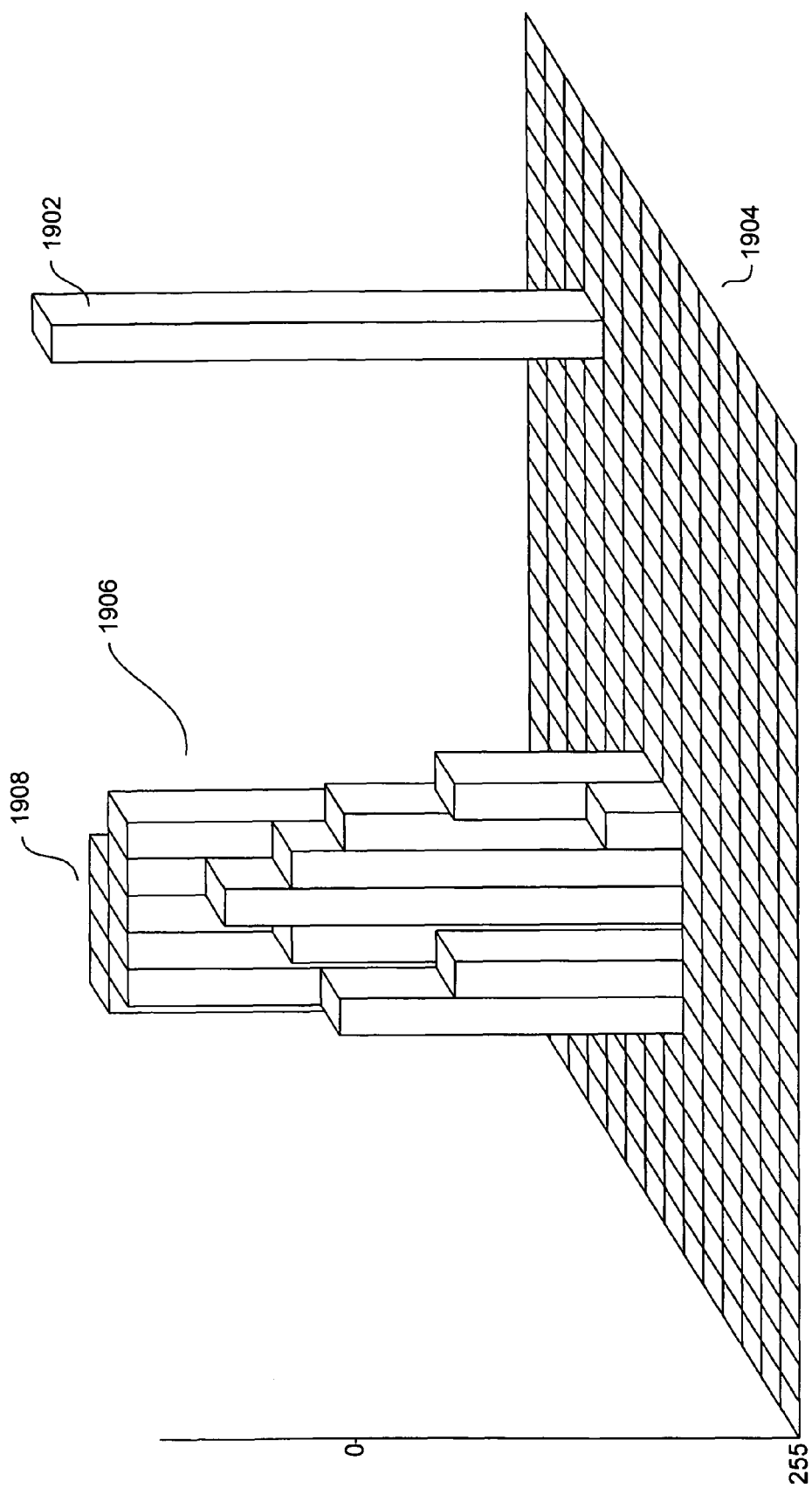
FIG. 19 shows, using illustration conventions similar to those used in FIGS. 3A-C, a graphical representation of pixel values for the portion of the text image shown in FIG. 18.

FIG. 19 shows, using illustration conventions similar to those used in FIGS. 3A-C, a graphical representation of pixel values for the portion of the text image shown in FIG. 18. The possible pixel values can be considered to be a set of symbols, and a pixel-based image can be considered to be a symbol sequence. The speck, or blotch (1806 in FIG. 18) comprises a single black pixel 1902 displaced by a magnitude equal to the full range of pixel values from the generally white background 1904 (assuming a convention in which pixels have byte numerical values, with white=255, black=0, and grayscale values between black and white having values from 1 to 254, decreasing in darkness as the numerical grayscale values increase). The period (1804 in FIG. 18) is, by contrast, represented by a roughly cylindrical column of pixels with grayscale values less, in numerical value, than 255 (1906 in FIG. 19). The central pixels of the period 1908 form a small grouping of black pixels at the center of the location of the period.

When using a denoising method to attempt to remove salt-and-pepper noise, the denoising method needs to distinguish between pixels with extreme grayscale values, such as the pixel 1902 in FIG. 19, that represent salt-and-pepper noise, from pixels with extreme grayscale values, such as the small group of pixels 1908 that represent the center of the period (1804 in FIG. 18) and the many white, background pixels, which do not represent noise. In current context-based methods, including the DUDE and DUDE-CTI methods, context-based statistics can be skewed by salt-and-pepper noise in ways that lead to failures to correct extreme-grayscale-valued noisy symbols, which, in turn, leads to readily perceptible degradation of images.

FIG. 20 illustrates one mathematical model used for impulse channels that introduce salt-and-pepper noise into data passed through impulse channels. Assuming that the probability of a symbol being altered to one of two extreme grayscale values by an impulse channel is $\lambda$, the probability that a clean, non-extreme-grayscale-valued symbol is not altered by the impulse channel is $1-\lambda$. The probability that a clean, extreme-grayscale-valued symbol is altered by the impulse channel to the opposite, extreme-grayscale-valued symbol is one-half the probability that a non-extreme-valued symbol is altered to either of the extreme grayscale values by the noisy channel, or $$\frac{\lambda}{2}.$$

The channel model matrix $\Pi$ for an impulse channel, given these assumptions, is shown as matrix 2002 in FIG. 2. The first column 2004 includes probabilities of each symbol of the alphabet being altered by the impulse channel to the lowest value extreme grayscale value, $a_1$. The final column 2006 in the channel model $\Pi$ 2002 includes probabilities of each of the symbols of the alphabet in the clean signal being altered to the highest valued extreme grayscale value, $a_n$. Multiplication of the counts of the occurrence of the different symbols, or of a probability distribution of the occurrence of the different symbols, in the clean signal 2008 by the channel probability matrix 2002 produces estimated counts, or an estimated probability distribution, 2010 for symbols in the noisy symbol sequence generated by passing the clean symbol sequence through an impulse channel. When considered as probability distributions, vectors 2008 and 2010 are assumed to be normalized.

As shown in FIG. 20, passing of the clean signal through the impulse channel increases the probabilities, in the resulting noisy symbol sequence, of symbols having one of the two extreme grayscale values, while decreasing the probabilities of the occurrence of non-extreme-grayscale-valued symbols with respect to the occurrence probabilities of the corresponding symbols in the clean symbol sequence. Assuming $a_1$ and $a_n$ to be the extreme-grayscale-value symbols, then:

$$P_z(a_1) = \left(1 - \frac{\lambda}{2}\right)P_x(a_1) + \frac{\lambda}{2}P_x(a_2) + \ldots + \frac{\lambda}{2}P_x(a_n)$$

$$P_z(a_r) = (1 - \lambda)P_x(a_r)$$

$$P_z(a_n) = \frac{\lambda}{2}P_x(a_1) + \frac{\lambda}{2}P_x(a_2) + \ldots + \left(1 - \frac{\lambda}{2}\right)P_x(a_n)$$

where r∈{$a_2, a_3, \ldots, a_{n-1}$};

$P_Z$=symbol-occurrence probability distribution for noisy-symbol sequence Z; and $P_x$=symbol-occurrence probability distribution for the clean symbol sequence X.

More complex models are possible, in which there are different probabilities associated with the transition of non-extreme-grayscale-valued symbols to each of the two extreme-grayscale-valued symbols.

Information-theory researchers and denoiser developers have sought enhancements or modifications to denoisers that employ context-based statistical analysis and memoryless channel models, such as DUDE and DUDE-CTI, in order to better handle salt-and-pepper noise. Embodiments of the present invention employ binary classification masks computed in an early 2-pass step, or as part of the 2-pass DUDE/DUDE-CTI methods, in order to avoid symbol substitution for those symbols unlikely to have been altered by an impulse channel, while employing symbol substitution for those symbols likely to have been altered by the impulse channel. In other words, these embodiments of the present invention direct denoising efforts to those symbols most likely to be noisy.

Figure 21:
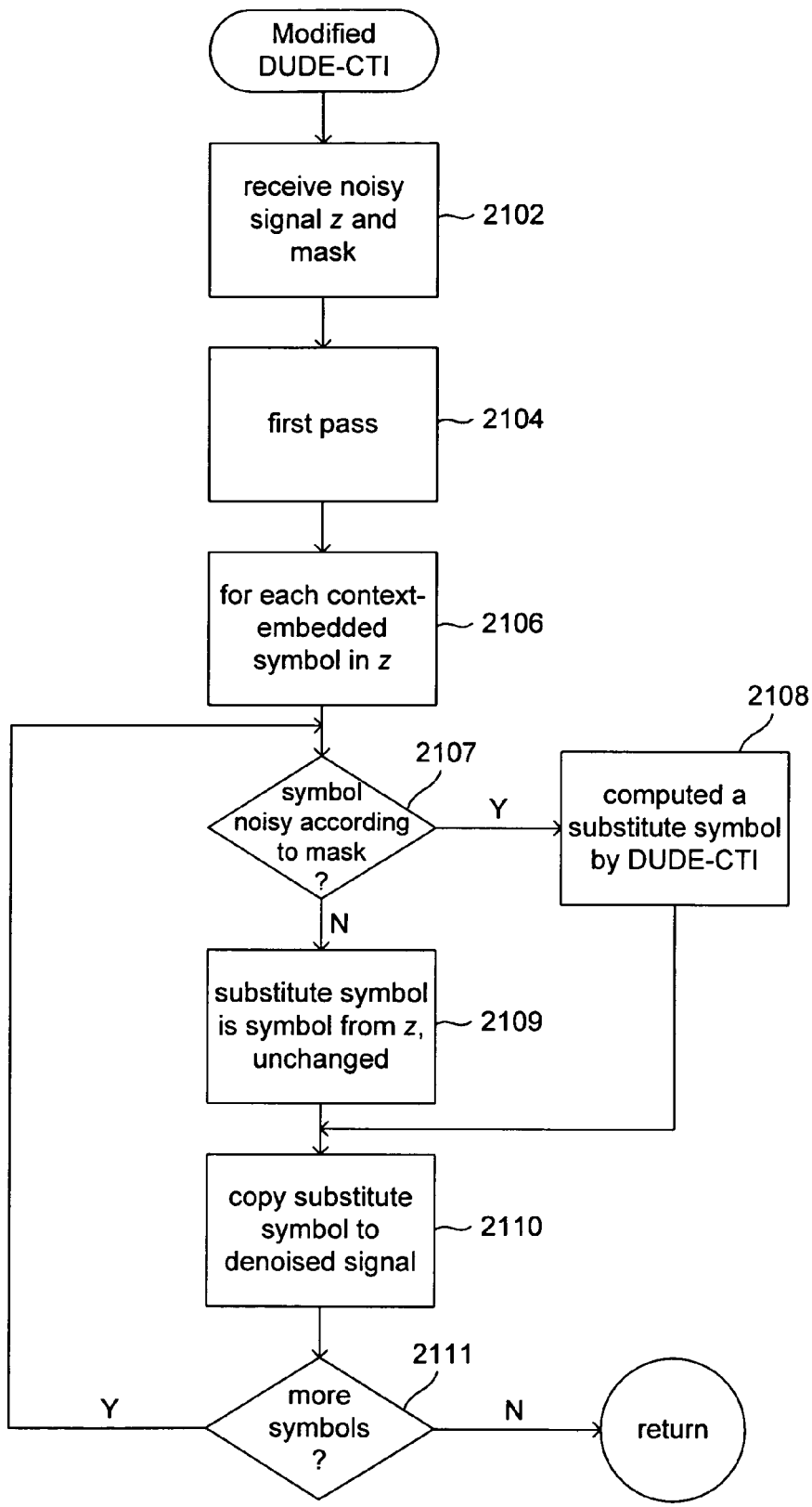
FIG. 21 is a control-flow diagram illustrating a modified DUDE-CTI that represents one embodiment of the present invention.

FIG. 21 is a control-flow diagram illustrating a modified DUDE-CTI that represents one embodiment of the present invention. In a first step 2102, the modified DUDE-CTI receives a noisy signal Z as well as a binary mask indicating which of the noisy-symbol-sequence symbols are likely to represent extreme-grayscale-valued noisy symbols. In step 2104, the modified DUDE-CTI carries out the first, statistics-collecting pass as described in a previous subsection. Next, in the for-loop comprising steps 2106-2111, the modified DUDE-CTI carries out symbol substitution in a second pass over the noisy symbol sequence Z. When considering a next noisy-symbol-sequence symbol in a next iteration of the for-loop of steps 2106-2111, the modified DUDE-CTI first determines, in step 2107, whether the next-considered symbol is likely to be noisy according to the indication for the next-considered symbol in the received binary mask. If the symbol has been determined to be a likely noisy symbol, then the modified DUDE-CTI computes the substitute symbol, in step 2108, as discussed in a previous subsection. Otherwise, in step 2109, the substitute symbol for the currently considered symbol is the currently considered symbol itself. In other words, no symbol substitution is undertaken for symbols not likely to be noisy according to the received mask. In step 2110, a substitute symbol, either computed in step 2108 or in changed noisy-symbol-sequence symbol step 2109, is copied into the proper position within the denoised signal generated by the modified DUDE-CTI. If more symbols of the noisy symbol sequence need to be processed in the for-loop, as determined in step 2111, control returns to step 2107. Otherwise, the modified DUDE-CTI has completed denoising.

As mentioned above, the binary masks may be computed prior to executing a modified DUDE, DUDE-CTI, or other context-based denoiser, and furnished to the modified denoiser as an argument, as in the modified DUDE-CTI method illustrated in FIG. 21. Alternatively, statistics for creating the binary masks may be computed in a first pass of the modified context-based denoiser, and the binary mask computed as an intermediate step prior to the second pass of the modified DUDE-CTI method. In an additional alternative method, statistics for creating the binary masks may be computed in a first pass of the modified context-based denoiser, and binary-mask values computed step-by-step as contexts are considered for symbol replacement in the second pass of the modified, context-based denoiser.

There are a number of different techniques for generating the binary masks used in the modified DUDE, DUDE-CTI, and other context-based denoising systems. Two methods for generating the binary mask are discussed below. First, however, the DUDE/DUDE-CTI denoising method is described again, with reference to FIGS. 22A-C, in summary fashion, as a basis for describing the two binary-mask-generation techniques that are based on the DUDE/DUDE-CTI methods.

DUDE/DUDE-CTI Revisited

Figure 22A:
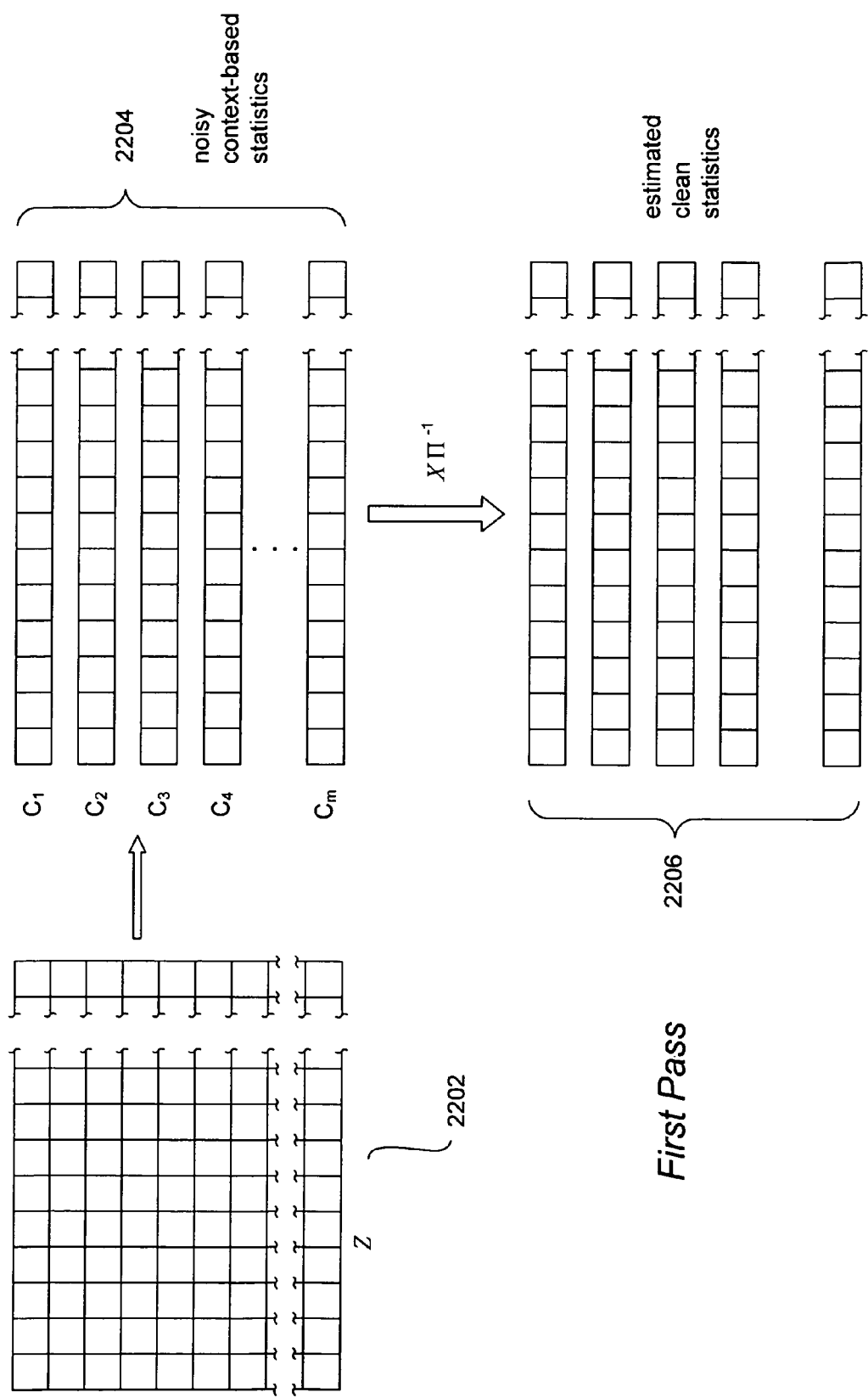
Figure 22B:
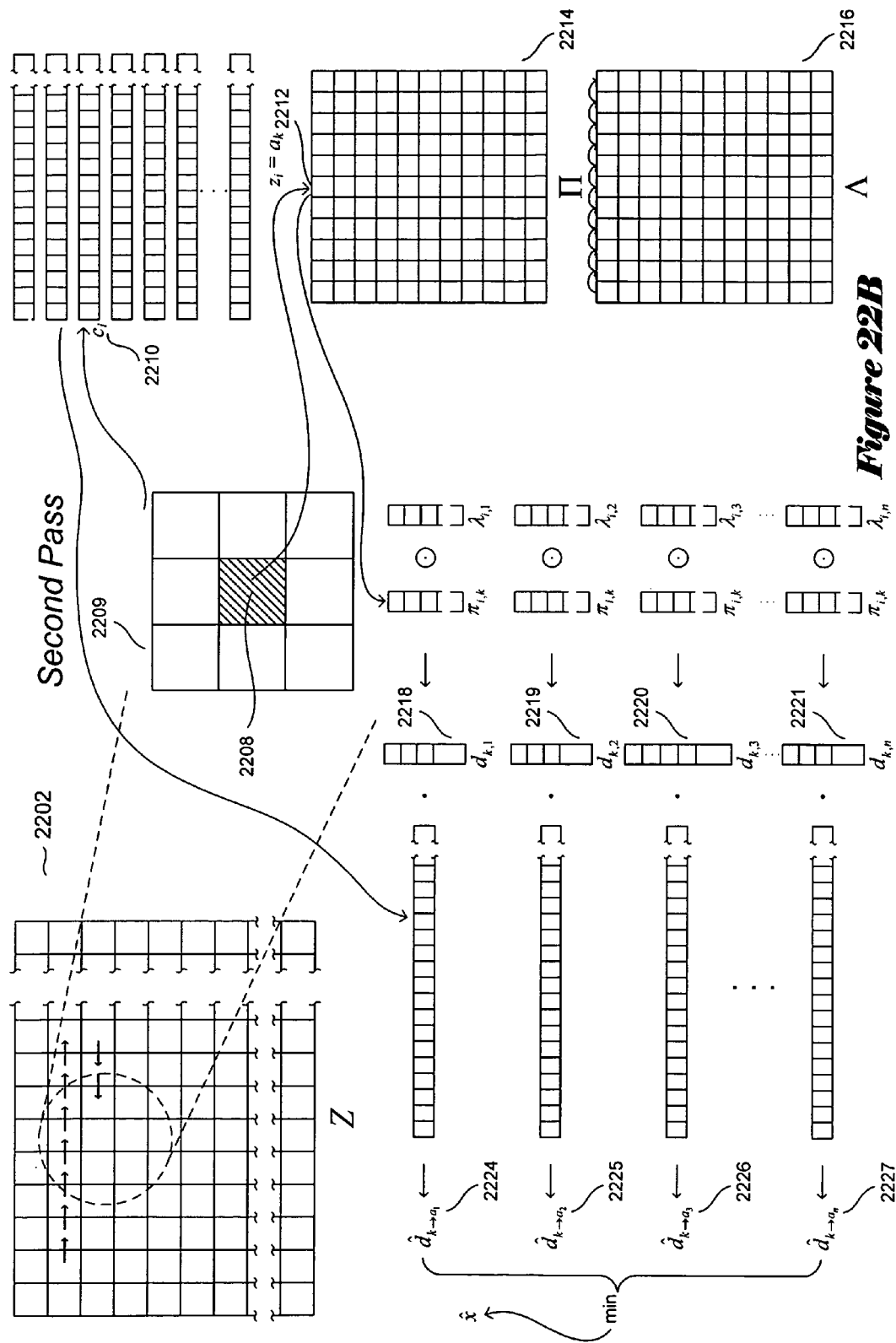

FIGS. 22A-C illustrate the DUDE/DUDE-CTI context-based denoising techniques. In a first pass, illustrated in FIG. 22A, a noisy symbol sequence Z 2202 is analyzed to produce noisy symbol-occurrence probability distributions, or symbol counts, for each possible context 2204 within the noisy symbol sequence Z. Multiplication of these symbol counts, or symbol-occurrence probability distributions, by the inverse of the channel matrix Π, then provides estimated counts, or clean symbol-occurrence probability distributions, for the clean signal 2206, as discussed in greater detail in the previous subsection. DUDE-CTI uses context-based-symbol prediction as well as a cluster-based method for achieving better statistics for contexts that occur at low frequencies, while DUDE computes clean symbol-occurrence probability distributions for each possible context.

FIG. 22B illustrates a second pass of the DUDE/DUDE-CTI denoising methods. In the second pass, each context-embedded symbol within the noisy symbol sequence Z 2202 is considered for symbol substitution, symbol-by-symbol, according to a traversal of the context-embedded symbols within the noisy sequence. For a particular context-embedded symbol 2208, the particular context surrounding the symbol $c_i$ 2209 is used to select the estimated clean symbol counts, or clean symbol-occurrence probability distribution, 2210 corresponding to the context. The symbol embedded within the context 2208, $z_i=a_k$, is used to select a column 2212 from the channel-model matrix Π 2214. For each possible symbol substitution $a_1$-$a_n$, a corresponding column is selected from the distortion matrix Λ 2216, and the selected column of the distortion matrix $\lambda_{i,1}, \lambda_{i,2}, \ldots, \lambda_{i,n}$ is multiplied, using the Schur product operation, by the selected channel-model matrix column 2212 to generate distortion vectors $d_{k,1}, d_{k,2}, \ldots, d_{k,n}$ 2218-2221 that represent the distortion incurred by substituting for noisy symbol sequence symbol k a particular substitution symbol $a_1, a_2, \ldots,$ or $a_n$. The dot product of the distortion vector and the selected estimated symbol-occurrence probability distribution 2210 generates distortion values 2224-2227 that indicate the distortion that would be reproduced by substituting each of the possible symbols in the alphabet A for noisy symbol sequence symbol $a_k$. The substitution symbol $\hat{x}$ for the context-embedded symbol $a_k$ is the symbol from A with the minimum computed distortion value of computed distortion values 2224-2227.

FIG. 22C summarizes the DUDE/DUDE-CTI method at the highest level. A noisy symbol sequence Z 2230 generated by passing a corresponding clean symbol sequence X through a noisy channel is transformed, in two passes, to a denoised symbol sequence 2232 $\hat{X}$ in which certain of the symbols have been replaced with substitute symbols by the method illustrated in FIG. 22B. Denoised symbol sequence $\hat{X}$ is closer to the original, clean symbol sequence X when denoising of the noisy signal Z is carried out successfully.

First Binary-Mask-Generation Method

Figure 23A:
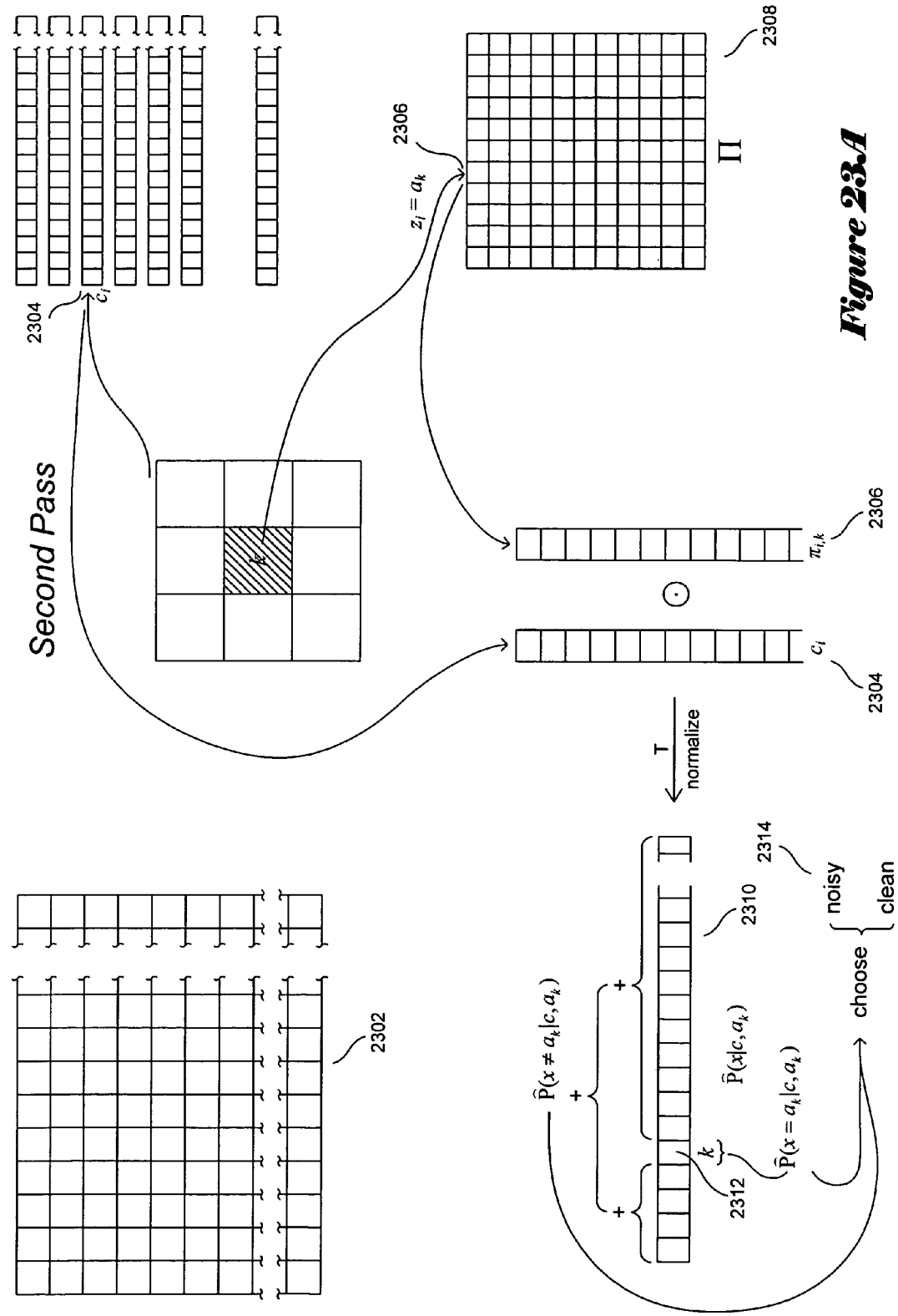
FIGS. 23A-B illustrate a first method for generation of a binary mask used in modified DUDE and DUDE-CTI denoising methods that represent embodiments of the present invention.
Figure 23B:
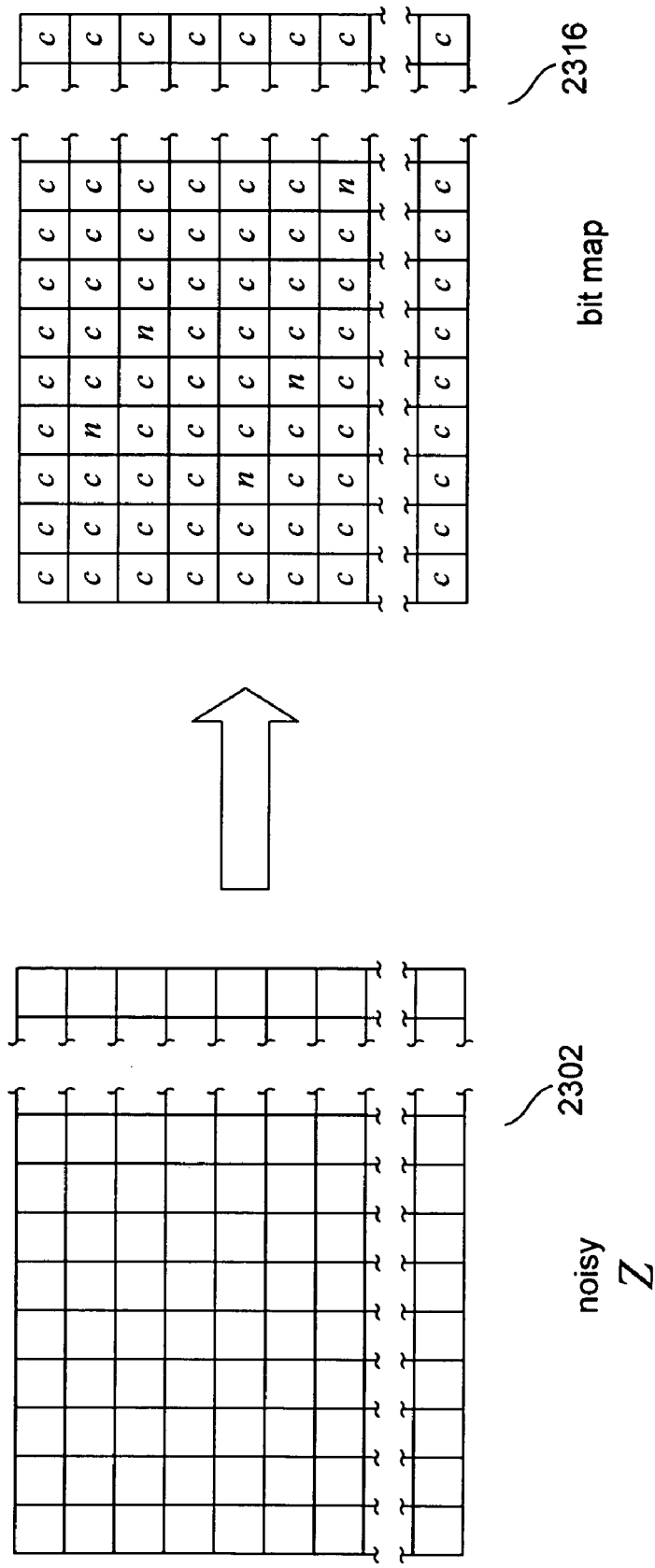

FIGS. 23A-B illustrate a first method for generation of a binary mask used in modified DUDE and DUDE-CTI denoising methods that represent embodiments of the present invention. The first pass of a two-pass method for generating the binary mask, generally a bit-map in which each bit represents whether or not the corresponding symbol in the noisy symbol sequence is likely to have been altered by passage through an impulse channel or noise channel with impulse-channel characteristics, is similar to the first pass of the DUDE/DUDE-CTI method, shown in FIG. 22A. However, because DUDE/DUDE-CTI methods may be less well suited to impulse noise, variations of DUDE/DUDE-CTI are used in the first step that are tailored for impulse noise.

FIG. 23A illustrates the second pass of the first technique for generating the binary mask that allows DUDE/DUDE-CTI context-based denoising methods to avoid substitution of symbols likely not to have been altered by an impulse channel. In the second pass, as in the second pass of the DUDE/DUDE-CTI, each context-embedded symbol within the noisy symbol sequence Z 2302 having one of the two extreme values is considered. As in the DUDE/DUDE-CTI method, the context selects an estimated clean symbol-occurrence probability distribution 2304, and the context-embedded symbol $z_i$ selects a particular column 2306 in the channel-model matrix Π 2308. However, in the binary-mask-generation method, the selected column of the channel model matrix Π 2306 and the selected estimated symbol-occurrence probability distribution 2304 are multiplied, using a Schur-product operation, to generate an estimated clean-symbol-sequence probability distribution conditioned on the selected context $c_i=c$ and context-embedded symbol $z_i=a_k$, $\hat{P}(x|c, a_k)$ 2310 (after normalization), the estimated conditional clean symbol-occurrence probability distribution $\hat{P}(x|c, a_k)$ transposed and normalized in FIG. 23A. From the estimated conditional clean symbol-occurrence probability distribution, the probability that the clean symbol $x_i$ corresponding, in position, to noisy-symbol-sequence symbol $z_i=a_k$ is equal to noisy-symbol-sequence symbol value $a_k$, $\hat{P}(x=a_k|c,a_k)$, is equal to the contents of the k-th symbol-occurrence probability 2312 in the estimated conditional clean symbol-occurrence probability distribution $\hat{P}(x|c,a_k)$ 2310. The probability that the clean symbol $x_i$ corresponding to noisy-symbol-sequence symbol $z_i=a_k$ is not equal to the noisy-symbol-sequence symbol value $a_k$, $\hat{P}(x \neq a_k|c,a_k)$, is equal to the sum of all remaining symbol-occurrence probabilities within the estimated conditional clean symbol-occurrence probability distribution $\hat{P}(x|c,a_k)$ 2310, as indicated in FIG. 23A. These two computed probabilities are then employed to decide whether noisy-symbol-sequence symbol $z_i=a_k$ is likely to have been altered by the impulse channel, or noisy 2314, or whether noisy-symbol-sequence symbol $z_i=a_k$ is likely unaltered by the impulse channel, or clean 2314.

Alternatively, rather than using a single first pass followed by a single second pass, an iterative approach may be employed in which execution of both a first-pass step and a second-pass step is repeated. In an initial first-pass step of the first iteration, the noisy image is first roughly cleaned with a rough denoiser, such as a selective median filter that only replaces extreme values, prior to using a context-based approach to build contexts from the roughly cleaned image and collecting counts for occurrences, in the original noisy image, of central-pixel symbols. The second-pass step described above with respect to FIG. 23A is then executed to complete the first iteration of the alternative method. In a second iteration of the alternative method, the classification produced by the second-pass step of the first iteration is used to carry out a modified DUDE-CTI denoising of the image, as discussed above with reference to FIG. 21 and/or below with reference to FIGS. 25-27, to produce a new denoised image, and both a first-pass step and second-pass step are again executed on this new denoised image. In the again-executed first-pass step and second-pass steps, contexts are generated from the new denoised image and used to collect central-pixel symbol-occurrence counts for noisy-image symbols. In various embodiments of the alternative method, two iterations may be employed, or iterations may continue until a convergence criterion is met.

As another alternative, an iterative approach may be used based on the approach discussed below with reference to FIGS. 25-57 in which extreme-valued pixels are first ignored in constructing initial merged contexts and classification based on the merged contexts, and the initial classifications may then be refined by considering as noisy pixels those pixels from the original image identified as noise by the initial classifier. In other words, multiple iterations of the classification passes are carried out prior to carrying out a single denoising step. The various alternative classification methods are directed to producing reliable clean symbol-occurrence probability distributions despite the presence of impulse noise in the original image.

FIG. 23B summarizes the first binary-mask-generation technique, the second pass of which is illustrated in FIG. 23A. A noisy symbol sequence Z 2302 is transformed to a binary mask, or bit map 2316 in two passes. The binary mask 2316 includes a single bit corresponding to each symbol in the noisy symbol sequence Z. One possible bit value represents "clean," and the other possible bit value represents "noisy." Thus, the binary mask indicates whether or not the corresponding symbol in the noisy symbol sequence is likely to have been altered by an impulse channel, and is therefore noisy, or likely not to have been altered by the impulse channel, and is therefore clean. This binary mask may be input to a modified DUDE or DUDE-CTI method, one embodiment of which is illustrated in FIG. 21, or computed as part of the DUDE or DUDE-CTI process.

The first binary-mask-generation method discussed with reference to FIGS. 23A-B can be considered as a classifier which decides which element, or state, of a binary class {noisy, clean} can be used to characterize each symbol in a noisy symbol sequence. A Hamming loss is used to model the performance of the classifier in terms of its decisions.

Consider a classifier with output D which has one of the two values "noisy" or "clean." Consider the loss function $$l(x, z, D) = \begin{cases} 1 & \text{if } x \neq z, D = \text{clean} \\ 1 & \text{if } x = z, D = \text{noisy} \\ 0 & \text{otherwise} \end{cases}$$

The decision rule which minimizes this cost of classifying a noisy-symbol-sequence symbol z is:

$$d(z) = arg_{D \in \{clean, noisy\}} \min E(l(x,z,D)|c,z)$$

where the expectation $E(.)$ is taken with respect to an estimated probability distribution of the clean symbol-sequence-symbol x conditioned on context class c and the corresponding noisy-symbol-sequence symbol z, $\hat{P}(x|c,z)=m^T\Pi^{-1}\odot\pi_z$, after normalization.

Because the minimization argument of d(z) has only two possible values:

$$E(l(x,z,D=\text{clean})|c,z)=\hat{P}(x \neq z|c,z)$$

and $$E(l(x,z,D=\text{noisy})|c,z)=\hat{P}(x=z|c,z)$$

the minimizing rule is very simple:

$$D = \begin{cases} \text{noisy} & \text{if } \hat{P}(x=z|c, z) \leq 0.5 \\ \text{clean} & \text{otherwise} \end{cases}$$

The cost of making a wrong decision is the same for both types of wrong decisions: (1) classifying a symbol as noisy when the symbol is clean; and (2) classifying a symbol as clean when the symbol is noisy. However, in practice, leaving a noisy pixel untouched can yield a very noticeable performance degradation since impulse noise takes extreme values which are not correlated to the context. On the other side, denoising clean values by mistake is not very noticeable, since the predictor usually yields "reasonable" values. This observation suggests that, instead of using an even cost function, a non-even cost function which gives more loss to the second type of decision should be used. Consider the following non-even loss function:

$$l'(x, z, D) = \begin{cases} \lambda_C & \text{if } x \neq z, D = \text{clean} \\ \lambda_N & \text{if } x = z, D = \text{noisy} \\ 0 & \text{otherwise} \end{cases}$$

where the cost of the second type of decision $\lambda_C$ would normally be greater than the cost of the first type of decision $\lambda_N$. Now the expected loss for each case is $$E(l'(x,z,D=\text{clean})|c,z) = \lambda_C \hat{P}(x \neq z|c,z)$$

and $$E(l'(x,z,D=\text{noisy})|c,z) = \lambda_N \hat{P}(x=z|c,z)$$

and, again, the decision rule would pick the one equation that yields a minimum loss, $$D = \begin{cases} \text{noisy} & \text{if } \lambda_C \hat{P}(x \neq z|c, z) > \lambda_N \hat{P}(x = z|c, z) \\ \text{clean} & \text{otherwise} \end{cases}$$

which can be rewritten as $$D = \begin{cases} \text{noisy} & \text{if } \frac{\hat{P}(x \neq z \mid c, z)}{\hat{P}(x = z \mid c, z)} > \theta, \theta = \frac{\lambda_N}{\lambda_C} \\ \text{clean} & \text{otherwise} \end{cases}$$

where θ is a fixed threshold which depends on the choice of $\lambda_N$ and $\lambda_C$. In the above description of the first binary-mask-generation technique, computation of the conditional probabilities $\hat{P}(x \neq z|c,z)$ and $\hat{P}(x=z|c,z)$ is discussed with reference to FIG. 23A. The choice of the classification made based on these probabilities 2314 can be made based on either of the above-described decision rules.

The above classification rules are special cases of a more general classification rule for a two-or-more-valued class variable D and a general loss function L(x,z,d) (mapping the triple of clean symbol x, noisy symbol z, and class value d to a numerical loss) in which the class D is set to $$D = \arg \min_d E(L(x, z, d)|c, z),$$

where the expectation is taken with respect to $\hat{P}(x|c,z) = m^T \Pi^{-1} \odot \pi_z$, determined above. This general rule reduces to the above rules when L(x,z,d) is set to l'(x,z,d) and l'(x,z,d), respectively, as defined above.

Second Binary-Mask-Generation Method

Figure 24A:
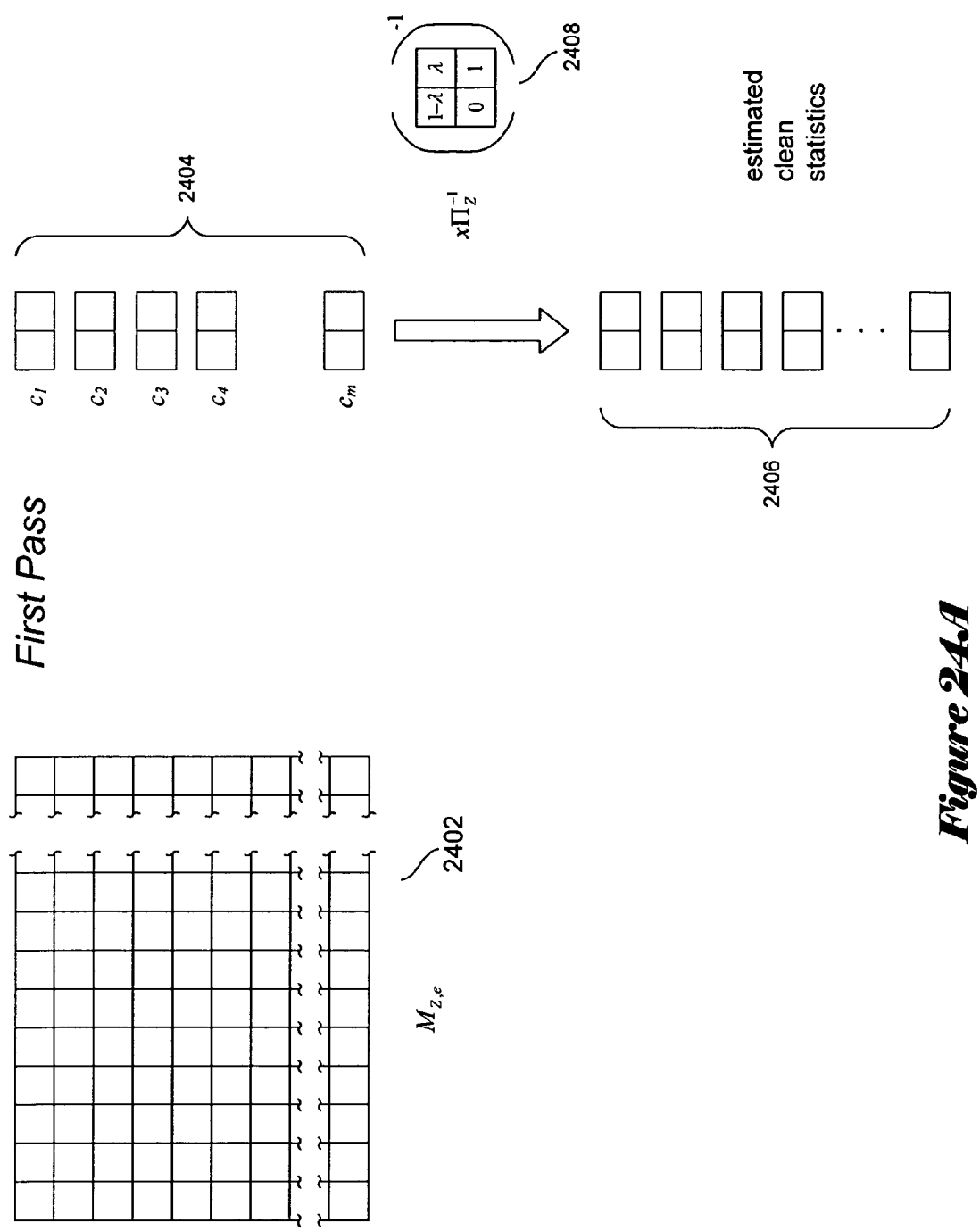
Figure 24B:
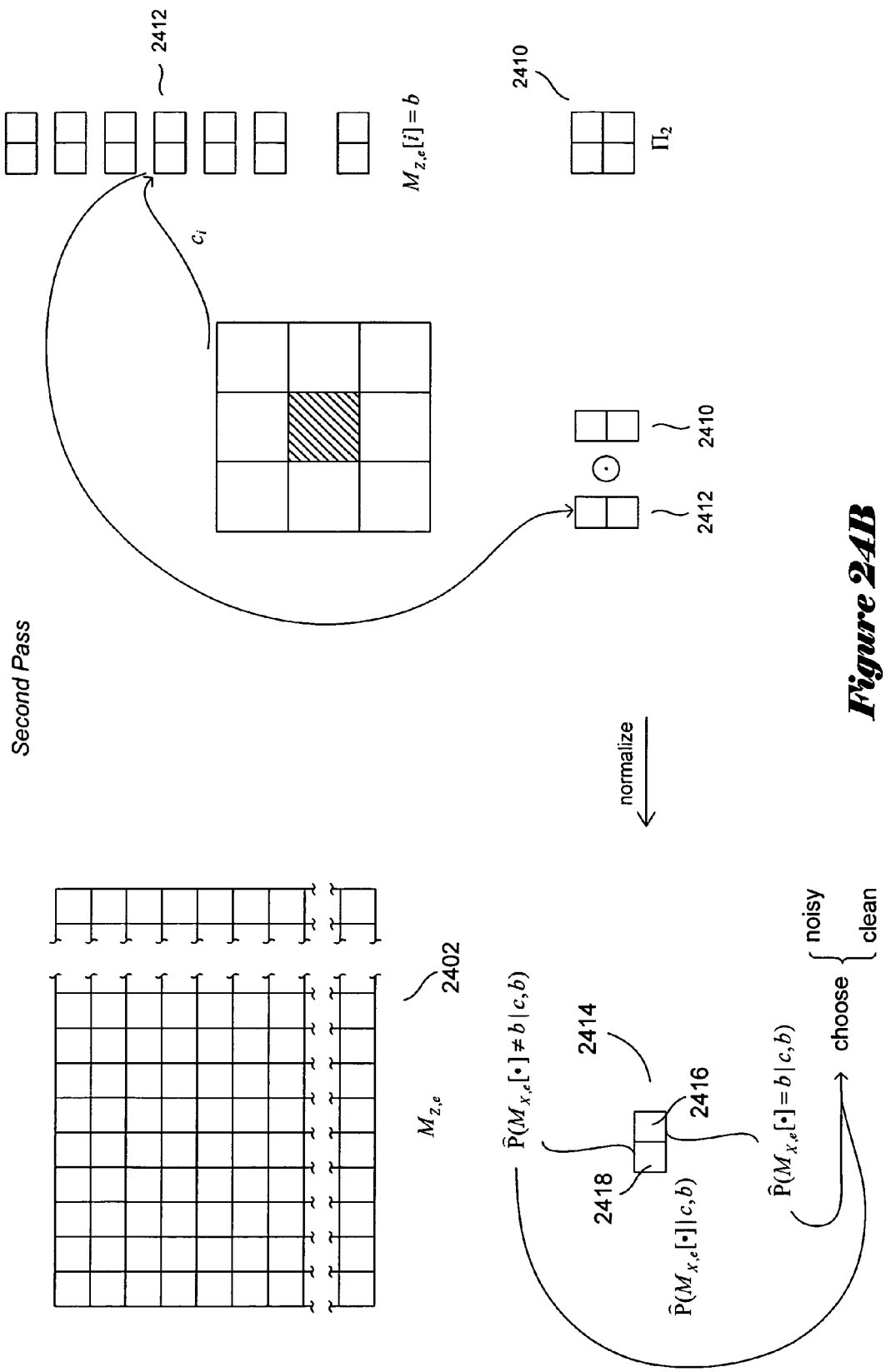
Figure 24C:
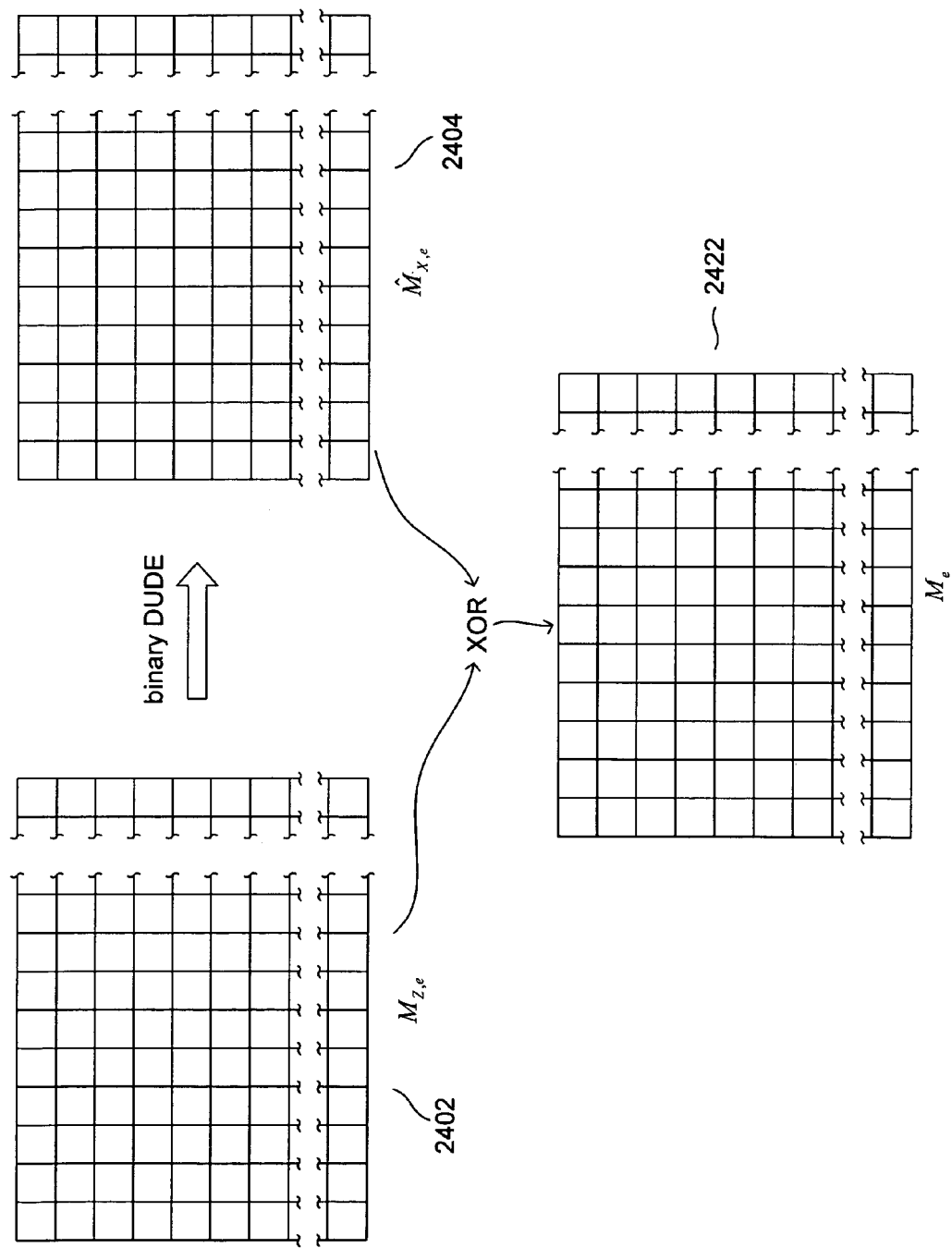

FIGS. 24A-D illustrate a second method for generation of a binary mask used in modified DUDE and DUDE-CTI denoising methods that represent embodiments of the present invention. FIG. 24A illustrates a first pass employed in the second binary-mask-generation method. First, a noisy binary mask 2402 is generated for a generic extreme symbol value e. Each bit in this binary mask corresponds to a symbol in the noisy symbol sequence Z. A bit represents whether or not the noisy symbol sequence symbol corresponding to the bit has the extreme (grayscale) value of e. For salt and pepper noise removal, e will, in turn, take on the values corresponding to black ($a_1$) and white ($a_n$), and two runs of the steps in FIGS. 24A-C are executed, once for each of these two values. The binary mask $M_{Z,e}$ 2402 is statistically analyzed, as in the first pass of the DUDE/DUDE-CTI, to produce bit counts, or bit-value-occurrence distributions, 2404 for each possible bit context within the binary mask $M_{Z,e}$. These noisy-binary-mask bit-value-occurrence distributions 2404 are converted to estimated clean-signal-mask bit-value distributions 2406 by multiplication by the inverse of the z-channel-model matrix $\Pi_z$ 2408. The z-channel-model matrix $\Pi_z$ is discussed in greater detail, below.

In a second pass, each context-embedded bit within the binary mask $M_{Z,e}$ 2402 is considered, analogously to the second pass of the DUDE/DUDE-CTI method. The embedded bit $M_{Z,e}[i]=b$ selects one of two columns of the z-channel model matrix $\Pi_z$ 2410, and the context $c_i=c$ selects one of the estimated bit-value probability distributions 2412. The selected bit-value-probability distribution 2412 and the selected z-channel model matrix $\Pi_z$ column 2410 are multiplied together by the Schur-product operation to produce an estimated bit-value probability distribution for a clean binary mask $M_{X,e}$, conditioned on occurrence of bit value b within context c, $\hat{P}(M_{X,e}[\bullet]|c,b)$ 2414, after normalization. Analogously to $M_{Z,e}$, each bit of $M_{X,e}$ indicates whether a corresponding symbol in the clean signal X has the value e. The probability indexed by b 2416 is the probability that the clean bit $M_{X,e}[i]$ corresponding to the bit $M_{Z,e}[i]=b$ in the binary mask $M_{Z,e}$ 2402 has the same value as bit $M_{Z,e}[i]=b$, $\hat{P}(M_{X,e}[\bullet]=b|c,b)$, and the remaining probability 2418 in the probability distribution corresponds to the probability that the bit $M_{X,e}[i]$ in the corresponding clean-signal binary mask does not have the same value as bit $M_{Z,e}[i]=b$ in the noisy binary mask $M_{Z,e}$ 2402, $\hat{P}(M_{X,e}[\bullet] \neq b|c,b)$ 2418. These two computed probabilities allow for choosing whether or not bit $M_{Z,e}[i]=b$ corresponds to a noisy or clean bit, analogous to the choice of noisy and clean designations for symbols in the first binary-mask-generation technique illustrated in FIG. 23A.

FIG. 24C illustrates the final steps in the generic extreme value e binary mask generation used in the second binary-mask-generation method. As discussed above, the noisy binary mask $M_{Z,e}$ 2402 is transformed, in a two-pass method, to produce a corresponding estimate of a binary mask $\hat{M}_{X,e}$ 2404 indicating whether or not each symbol of the clean symbol sequence corresponding to noisy symbol sequence Z has the extreme grayscale value e. The binary mask $M_{Z,e}$ is XORed (exclusive or) with computed binary mask $\hat{M}_{X,e}$ 2404 to produce a final binary mask $M_e$, each bit of which indicates whether or not the corresponding symbol of the noisy symbol sequence represents a noisy symbol with the particular extreme grayscale value e.

FIG. 24D illustrates a final step in the second binary-mask-generation method. The steps of FIGS. 24A-C described above are executed for extreme gray-scale values e=$a_1$ (black) and e=$a_n$ (white). A first final binary mask $M_{a_1}$ 2430 computed by the above-described method illustrated in FIGS. 24A-C and representing whether or not each symbol in the noisy symbol sequence Z represents a noisy symbol with extreme grayscale value "black," and a second binary mask $M_{a_n}$ 2432 produced by the method illustrated in FIGS. 24A-C and representing whether the corresponding symbol in the noisy symbol sequence Z presents a impulse-channel-altered symbol with extreme grayscale value "white," are ORed together by the binary OR operation to produce a final binary mask, $M_{saltandpepper}$, 2434 similar to the binary mask 2316 in FIG. 23B produced by the first binary-mask generation technique. A bit value of 1 in $M_{saltandpepper}$ indicates that the corresponding symbol is determined to be noise while a bit value of 0 indicates that the corresponding symbol is determined to have been unaltered by the channel. Finally, by feeding this final error mask $M_{saltandpepper}$ to the second stage of the continuous tone denoiser, a good classification of which pixels should actually be replaced is obtained.

Each run of the steps in FIGS. 24A-B in the second binary-mask-generation technique is based on two impulse-like channels. Each channel corresponds to one of a salt or pepper channel, rather than to a salt-and-pepper-generating impulse channel, with probability of a symbol changing to the extreme gray value being $\lambda$. In other words, $\lambda$ is the probability of a symbol changing to a single extreme value, rather than, in the previous discussion, the probability of a symbol changing to either of two extreme values. Consider a sequence $X=\{x_i\}$ that has been corrupted by this noise to yield a noisy sequence $Z=\{z_i\}$. Now take the noise mask sequence, $M_{Z,e}$, which is defined as $$M_{Z,e}[i] = \begin{cases} 0, z_i \neq e \\ 1, z_i = e \end{cases}$$

where e is the extreme gray value, taking on one of the two values $a_1$ or $a_n$, respectively, in the two runs of steps in FIGS. 24A-C. This is a binary sequence which has a "1" wherever there is a potential noisy extreme gray valued sample. The $M_{Z,e}$ sequence can be considered to itself be a noisy sequence with a corresponding clean mask sequence, $M_{X,e}$:

$$M_{X,e}[i] = \begin{cases} 0, x_i \neq e \\ 1, x_i = e \end{cases}$$

This is also a binary sequence, but it marks those clean pixels that coincide with the extreme symbol value e. If a pixel in the clean mask is "1," then it can only be 1 in the noisy mask because it would also be e. If it was 0, however, it has a probability of exactly $\lambda$ of becoming 1:

$P(M_{Z,e}[i]=0/M_{X,e}[i]=1)=0$ $P(M_{Z,e}[i]=1/M_{X,e}[i]=1)=1$ $P(M_{Z,e}[i]=0/M_{X,e}[i]=0)=1-\lambda$ $P(M_{Z,e}[i]=1/M_{X,e}[i]=0)=\lambda$ This is known as the Z-channel, and its channel-model matrix is:

$$\Pi_z = \begin{vmatrix} 1-\lambda & \lambda \\ 0 & 1 \end{vmatrix}$$

This well-known channel is easy to invert for any $\lambda \neq 0$, and is also memoryless. The $M_{Z,e}$ binary sequence can be denoised using the modified DUDE in a very efficient way to yield an approximation of $M_{X,e}$, $\hat{M}_{X,e}$. This process is precisely what is described in FIGS. 24A-B and the related discussion above.

Although the present invention has been described in terms of particular embodiments, it is not intended that the invention be limited to these embodiments. Modifications within the spirit of the invention will be apparent to those skilled in the art. For example, an essentially limitless number of different implementations of noisy-symbol-determination methods that represent embodiments of the present invention can be developed using different control structures, modular organizations, programming languages, data structures, and by varying other programming parameters. The methods of the present invention may be implemented as software, as firmware, as logic circuits within a hardware device, or as a combination of software, firmware, and logic circuits. A variety of different channel models, loss functions, and other parameters of the above-described methods may be employed to optimize the methods for various types of symbol sequences and noise-inducing processes. Symbol sequences may vary in size depending on the nature of the noisy sequence that needs to be denoised. While the above-described methods are particularly useful modifications of the DUDE and DUDE-CTI approaches, they can be applied to enhance a wider range of context-based denoising methods. While it is convenient to store the classifications of symbols as being likely noisy and likely clean in a binary mask or bit mask, the classifications may be carried out in parallel with other tasks, and either not stored, or stored in other types of data structures. The above-described first-binary-mask-generation technique may be based on first-pass gathering of statistics for all contexts, as in DUDE, or for clusters, as in DUDE-CTI. The above-described second-binary-mask-generation technique may create multiple masks for multiple erasure symbols, and OR them together to produce a final binary mask.

In general, the first binary mask-generation technique, described above, represents one example of a more general DUDE-based classifier in which the loss function depends on three inputs: (1) the noisy symbol; (2) the clean symbol; and (3) a classification value. In the above-described first binary mask-generation technique, the classification value is one of two values: (1) noisy; and (2) clean. However, in alternative classifiers, the classification value may have an arbitrary number of values, as long as a pixel can be assigned to a classification value based on an estimated, clean-symbol-sequence probability distribution conditioned on selected contexts and context-embedded symbols. In addition, the three-input variable dependent loss function may take on arbitrary values for each triple of input values.

Figure 25:
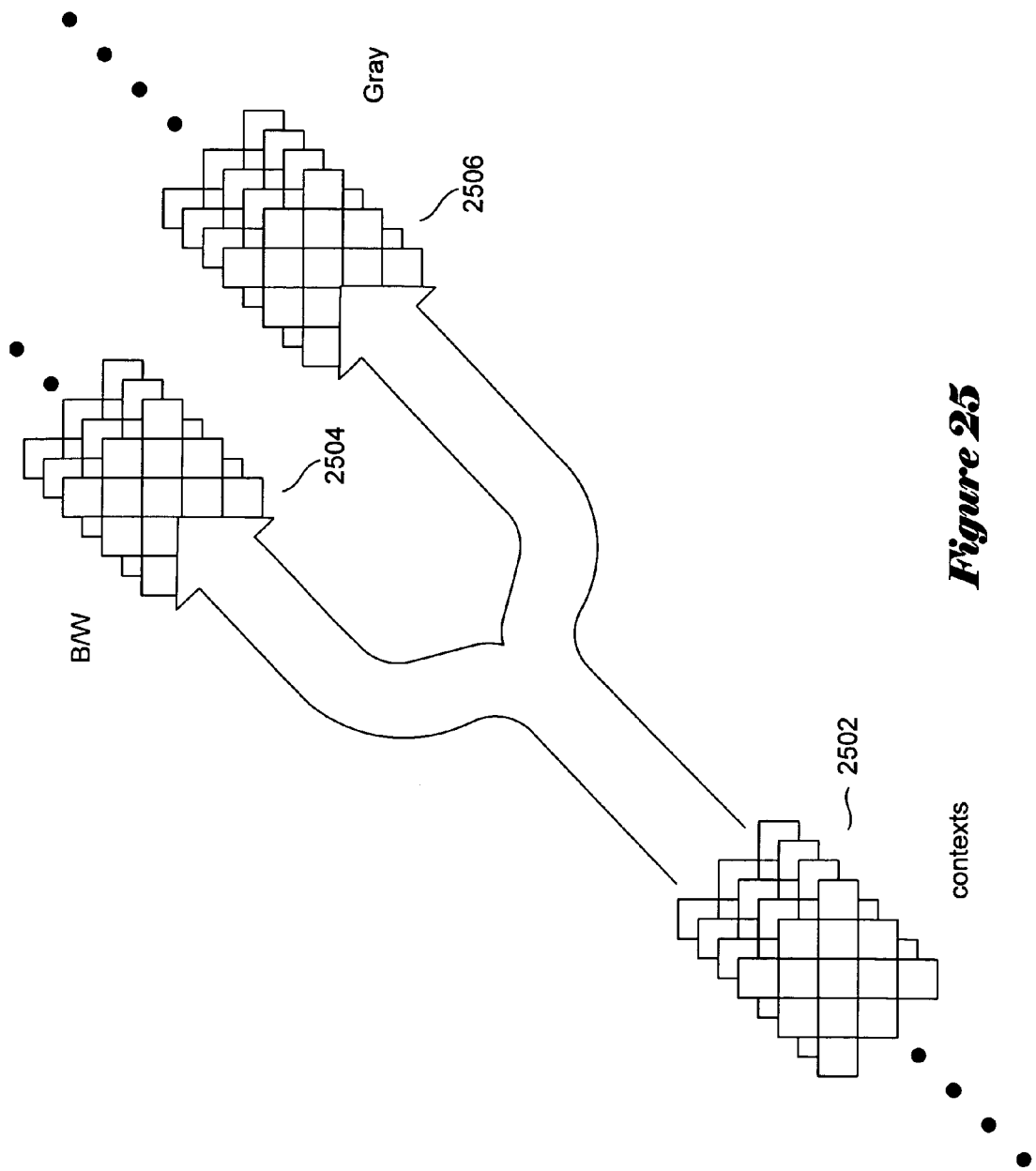
FIG. 25 illustrates context sorting according to embodiments of the present invention.
Figure 26:
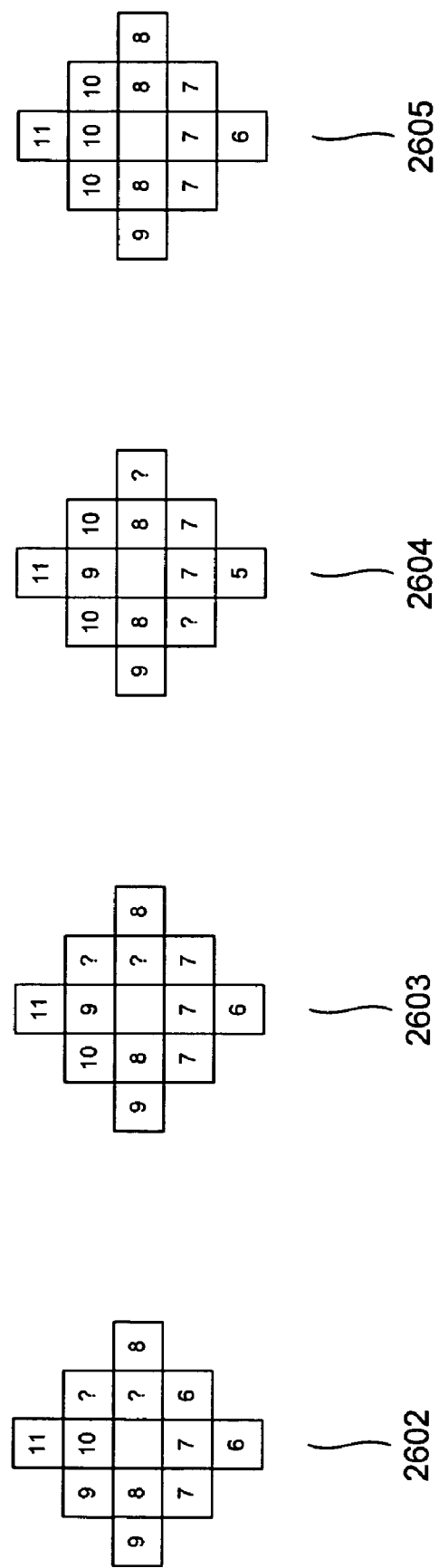
FIG. 26 shows a hypothetical cluster of similar contexts, some of which include extreme-valued symbols, whose symbol counts would be blended to obtain a blended symbol count for a first context according to embodiments of the present invention.

A DUDE-based classifier, such as the first and second binary-mask-generation methods described above, can be incorporated, in a variety of different ways, within a general denoiser for denoising noisy images and other noisy data, particular data that includes extreme-valued symbols generated by an impulse noise channel, as discussed above. In one embodiment of the present invention, the DUDE-based classifier can be used to determine which of the extreme-valued pixels in a noisy image are likely to be legitimate pixel values, such as black pixels in a shadow region of a black-and-white image that includes dark shadows, and which of the extreme-valued pixels represent impulse noise introduced by an impulse noise channel, such as an above-discussed salt-and-pepper-noise-generating channel. The contexts for all pixels in the noisy image can then be sorted into extreme-valued contexts, which include only extreme-valued pixels, and grayscale contexts, which include non-extreme-valued pixels. FIG. 25 illustrates context sorting according to embodiments of the present invention. A sequence of contexts generated for pixels of a noisy image 2502 are classified as extreme-valued contexts 2504 and grayscale contexts 2506 based on whether the contexts contain only extreme-valued pixels or contain some non-extreme-valued pixels. Assuming two extreme values, as in the salt-and-pepper channel, the extreme-valued contexts can then be used for binary, DUDE-based denoising, based on the extreme-valued contexts, and the grayscale contexts can be used in context-based denoising, such as the DUDE, or blended and used in blended-context-based denoising, such as DUDE-CTI, with provisions made for dealing with extreme-valued symbols in contexts. For example, center pixel symbol counts or prediction error counts for extreme-valued-symbol-containing contexts may be blended, through a weighted or unweighted linear combination, with counts from contexts that do not contain extreme-valued symbols by ignoring noisy extreme-valued symbols. FIG. 26 shows a hypothetical cluster of similar contexts, some of which include extreme-valued symbols, whose symbol counts would be blended to obtain a blended symbol count for the first context 2602 according to embodiments of the present invention. All four contexts 2602-2605 in the cluster have similar pixel-value patterns. The first three contexts have question marks as pixel values indicating noisy extreme-valued symbols detected by applying a DUDE-based classifier to classify symbols in a noisy signal as likely representing symbols altered by impulse-noise, or, in other words, noisy extreme-valued symbols, or representing unaltered clean symbols. In one method of the present invention, pixel-value-based clustering ignores the identified noisy extreme-valued symbols, and clusters contexts based only on non-noisy symbols, classified as unaltered. In such an embodiment, the cluster of contexts whose counts are blended or combined to obtain blended counts for a given context is not necessarily disjoint from the cluster corresponding to another context. For example, consider two contexts containing no noisy extreme-values which differ significantly in a few locations that would lead them to be placed in different clusters by a pixel-value clustering method. Now consider a third context which includes noisy extreme-valued symbols in all locations corresponding to the significantly differing locations of these two contexts, and otherwise has symbol values in the remaining locations that are similar to corresponding values in the two contexts. Under an embodiment of the classifier enhanced denoising just described, the blending cluster for this third context, might, based on a pixel-value clustering method that ignores extreme-valued symbols classified as noisy, include the two contexts. Thus the blending cluster for the third context differs from the blending clusters of the first two contexts, yet is not disjoint from either, as it contains the two respective contexts. In alternative methods, some noisy extreme-valued symbols may be used, as non-extreme-valued-symbol values, to determine clustering and for clean-symbol prediction.

Figure 27:
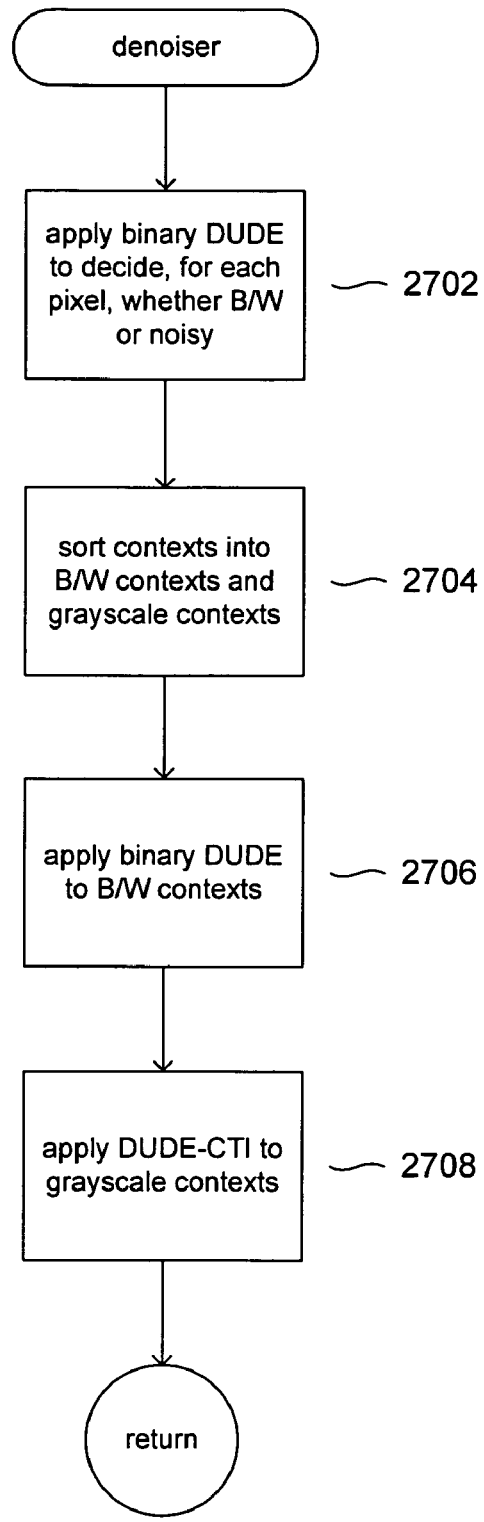
FIG. 27 provides a control-flow diagram illustrating a denoiser implementation that employs a DUDE-based classifier to determine which of the extreme-valued pixels in a noisy image are likely legitimate extreme-valued pixels and which of the extreme-valued pixels represent noise introduced by an impulse-noise channel and that represents an embodiment of the present invention.

FIG. 27 provides a control-flow diagram illustrating a denoiser implementation that employs a DUDE-based classifier to determine which of the extreme-valued pixels in a noisy image are likely legitimate extreme-valued pixels and which of the extreme-valued pixels represent noise introduced by an impulse-noise channel and that represents an embodiment of the present invention. In step 2702, the DUDE-based classifier is used to classify extreme-valued pixels as being either legitimate, extreme-valued pixels or noisy symbols. In step 2704, all contexts generated from the noisy signal are classified as being extreme-valued contexts or grayscale contexts, and sorted into a first group of extreme-valued contexts and a second group of grayscale contexts. Then, in step 2706, a binary or smaller-alphabet DUDE is employed to denoise pixels embedded within extreme-valued contexts. Finally, in step 2708, a DUDE-CTI is employed to denoise those pixels embedded within grayscale contexts. In alternative embodiments, the determination of legitimately-valued pixels and pixels representing noisy symbols is used to weight pixels and contexts, with the weights factored into pixel-value prediction in subsequent steps.

In yet additional embodiments, the methods of the present invention may be used to associate metrics with symbols of a noisy symbol sequence. From the probability distribution conditioned on the selected context $c_i=c$ and context-embedded symbol $z_i=a_k$, $\hat{P}(x|c,a_k)$, a probability that a particular context-embedded symbol lies within a set of symbol values $\delta(a_k)$ that depends on $a_k$, $\hat{P}(x\in\delta(a_k)|c,a_k)$, or a probability that a particular context-embedded symbol does not lie within the set of symbol values $\delta(a_k)$, $\hat{P}(x\notin\delta(a_k)|c,a_k)$, can be computed as a confidence level for a subsequent classification of the symbol based on the probability distribution conditioned on the selected context $c_i=c$ and context-embedded symbol $z_i=a_k$, $\hat{P}(x|c,a_k)$. Alternative system embodiments may employ the above-described confidence-level-computation method. The set of symbol values $\delta(a_k)$, in certain embodiments, may be considered to be an interval, with or without holes, in a symbol value space about the point in symbol space represented by the symbol-value $a_k$.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method for classifying symbols, $z_i$, of a noisy symbol sequence, generated by passing a corresponding clean symbol sequence through a noise-inducing channel, as each having one of two or more classification values, the method carried out by a computer system executing computer instructions that implement the method, the method comprising:

for each context in the noisy symbol sequence, determining, by the computer system, an estimated context dependent clean symbol-occurrence probability distribution; and for each context-embedded symbol $z_i$ embedded within a context $c_i$ within the noisy symbol sequence, determining, by the computer system, an estimated clean symbol-occurrence probability distribution conditioned on the selected context $c_i=c$ and context-embedded symbol $z_i=a_k$, $\hat{P}(x|c,a_k)$, and based on $\hat{P}(x|c,a_k)$ and a three input variable dependent loss function $L(x,z,d)$ depending on a clean symbol value x, a noisy symbol value z, and a class value d, classifying, by the computer system, the context-embedded symbol $z_i$ as having a particular one of the two or more classification values.

2. The method of claim 1 wherein determining an estimated context dependent clean symbol-occurrence probability distribution for each context in the clean symbol sequence further comprises:

for each context in the noisy symbol sequence, determining a noisy-symbol-sequence symbol-occurrence probability distribution for the noisy symbol sequence; and for each context in the noisy symbol sequence, determining an estimated context dependent clean symbol-occurrence probability distribution by multiplication of the noisy-symbol-sequence probability distribution by an inverse channel-model matrix.

3. The method of claim 1 further including classifying symbols of the noisy symbol sequence as being either likely altered by the channel, or "noisy," or as being likely not altered by the channel, or "clean," by:
   determining, from the estimated clean-symbol-sequence symbol-occurrence probability distribution conditioned on the selected context $c_i=c$ and context-embedded symbol $z_i=a_k$, $\hat{P}(x|c,a_k)$, the probability that the clean-symbol-sequence symbol $x_i$ corresponding, in position, to noisy-symbol-sequence symbol $z_i=a_k$ is equal to noisy-symbol-sequence symbol value $a_k$, $\hat{P}(x=a_k|c,a_k)$, and the probability that the clean-symbol-sequence symbol $x_i$ corresponding to noisy-symbol-sequence symbol $z_i=a_k$ is not equal to the noisy-symbol-sequence symbol value $a_k$, $\hat{P}(x \neq a_k|c,a_k)$; and
   based on $\hat{P}(x=a_k|c,a_k)$ and $\hat{P}(x \neq a_k|c,a_k)$, classifying the context-embedded symbol $z_i$ as being "noisy" or "clean."

4. The method of claim 3 wherein determining estimated clean-symbol-sequence symbol-occurrence probability distribution conditioned on the selected context $c_i=c$ and context-embedded symbol $z_i=a_k$, $\hat{P}(x|c,a_k)$ further comprises:
   selecting a column of the channel-model matrix including probabilities of channel-induced transitions from clean-symbol-sequence symbols $a_x$ to symbol $a_k$; and
   multiplying, using a Schur-product operation, the selected column of the channel-model matrix and an estimated context dependent clean-symbol-sequence probability distribution for context $c_i$.

5. The method of claim 2 wherein classifying the context-embedded symbol $z_i$ as being "noisy" or "clean" based on $\hat{P}(x=a_k|c,a_k)$ and $\hat{P}(x \neq a_k|c,a_k)$ further comprises:
   classifying the context-embedded symbol $z_i$ as "noisy" when $\hat{P}(x=a_k|c,a_k) \leq 0.5$; and
   Otherwise classifying the context-embedded symbol $z_i$ as "clean."

6. The method of claim 2 wherein classifying the context-embedded symbol $z_i$ as being "noisy" or "clean" based on $\hat{P}(x=a_k|c,a_k)$ and $\hat{P}(x \neq a_k|c,a_k)$ further comprises:
   choosing non-equal values of $\lambda_C$ and $\lambda_N$ with $\lambda_C \geq \lambda_N$;
   classifying the context-embedded symbol $z_i$ a "noisy" when $\lambda_C \hat{P}(x \neq a_k|c,a_k) > \hat{P}(x=a_k|c,a_k)$; and,
   otherwise classifying the context-embedded symbol $z_i$ as "clean."

7. The method of claim 2 further comprising storing classifications of the noisy-symbol-sequence symbols as being "noisy" or "clean" in a binary mask.

8. The method of claim 2 further comprising using classifications of the noisy-symbol-sequence symbols as "noisy" or "clean" during context-based denoising of the noisy symbol sequence to avoid replacing noisy-symbol-sequence symbols classified as "clean."

9. Computer instructions that implemented the method of claim 2 encoded in a computer-readable medium.

10. The method of claim 2 encoded in software, firmware, logic circuits, or a combination of software, firmware, and logic circuits within a data-acquisition, data-storage, data-processing, or data-transfer device that employs a denoiser to denoise a noisy symbol sequence.

11. A method for classifying symbols of a noisy symbol sequence, generated by passing a corresponding clean symbol sequence through a noise-inducing channel, as being either likely altered by the channel, or "noisy," or as being likely not altered by the channel, or "clean," the method carried out by a computer system executing computer instructions that implement the method, the method comprising:
   constructing, by the computer system, a final binary mask $M_e$ for each extreme symbol value e corresponding to a potentially "noisy" symbol within the noisy symbol sequence, binary-mask element representing whether or not each symbol in the noisy symbol sequence represents a noisy symbol with a particular one of possible extreme grayscale values; and
   combining, by the computer system, the final binary masks by successive logical OR operations to produce a final binary mask that indicates whether each symbol in the noisy symbol sequence is "noisy" or "clean."

12. The method of claim 11 wherein constructing a final binary mask $M_e$ for each extreme symbol value e corresponding to a potentially "noisy" symbol within, the noisy symbol sequence, each -binary-mask element representing whether or not each symbol in the noisy symbol sequence represents a noisy symbol with extreme grayscale value e, further comprises:
   for each extreme symbol value e,
      constructing a noisy mask $M_{Z,e}$, each element of which indicates whether a corresponding symbol of the noisy symbol sequence has the particular one of possible extreme grayscale values;
      constructing an estimated clean mask $\hat{M}_{X,e}$, each element of which indicates whether a corresponding symbol of the clean symbol sequence probably has the particular one of possible extreme grayscale values; and
      combining the noisy mask $M_{Z,e}$ with the estimated clean mask $\hat{M}_{X,e}$ using an XOR logical operation that XORs the values of corresponding elements of the binary mask and the estimated binary mask.

13. The method of claim 11 wherein constructing an estimated clean mask $\hat{M}_{X,e}$, each element of which indicates whether a corresponding symbol of the clean symbol sequence probably has the particular extreme grayscale value e, further comprises:
   for each, context $c_i=c$ and each context-embedded bit $M_{Z,e}[i]=b$ in the noisy mask $M_{Z,e}$,
      determining an estimated clean bit-occurrence probability distribution $\hat{P}(M_{X,e}[\bullet]|c,b)$;
      based on $\hat{P}(M_{X,e}[\bullet]=b|c,b)$ and $\hat{P}(M_{X,e}[\bullet] \neq b|c,b)$, determining a value for the element of the estimated clean mask corresponding to bit b of the noisy mask.

14. The method of claim 13 wherein determining the estimated clean bit occurrence probability distribution $\hat{P}(M_{X,e}[\bullet]|c,b)$ further comprises:
   selecting column of the Z-channel-model matrix including probabilities of channel-induced transitions front estimated clean mask bit values, or corresponding clean-symbol-sequence symbols, to the particular one of possible extreme grayscale values; and
   multiplying using a Schur-product operation, the selected column of the Z-channel-model-matrix and the estimated context dependent clean-signal-mask bit-value distribution.

15. The method of claim 14 wherein determining the estimated clean bit-occurrence probability distribution $\hat{P}(M_{X,e}[\bullet]|c,b)$ further comprises;
   statistically analyzing the binary mask $M_{Z,e}$ to produce bit counts or bit-value-occurrence distributions, for each bit context within the binary mask $M_{Z,e}$; and converting the bit-value-occurrence distributions to estimated context dependent clean-signal-mask bit-value distributions by multiplication by the inverse of the z-channel-model matrix $\Pi_z$.

16. The method of claim 11 further comprising using classifications of the noisy-symbol-sequence as "noisy" or "clean" during context-based denoising of the noisy symbol sequence to avoid replacing noisy-symbol-sequence symbols classified as "clean."

17. Computer instructions that implement the method of claim 11 encoded in a computer-readable medium.

18. The method of claim 11 encoded in software, firmware, logic circuits, or a combination of software, firmware, and logic circuits within a data-acquisition, data-storage, data-processing, or data-transfer device that employs a denoiser to denoise a noisy symbol sequence.

19. A method for classifying symbols, $z_i$, of a noisy symbol sequence, generated by passing a corresponding clean symbol sequence through a noise-inducing channel, as each having one of two or more classification values, the method carried out by a computer system executing computer instructions that implement the method, the method comprising:
  roughly cleaning, by the computer system, the noisy symbol sequence to produce a next context-generating symbol sequence; and
  iteratively
    determining, by the computer system, for each context generated from the next context-generating sequence, an estimated context-dependent clean-symbol-sequence symbol-occurrence probability distribution, and
    for each noisy-symbol-sequence symbol $z_i$ embedded within a context $c_i$ generated from the next context-generating symbol sequence,
      determining, by the computer system, an estimated clean-symbol-sequence symbol-occurrence probability distribution conditioned on the selected context $c_i=c$ and context-embedded symbol $z_i=a_k$, $\hat{P}(x|c,a_k)$
      based on $\hat{P}(x|c,a_k)$ and a three input variable dependent loss function $L(x,z,d)$ depending on a clean-symbol-sequence symbol value x, a noisy-symbol-sequence symbol value z, and a class value d, classifying, by the computer system, the context-embedded symbol $z_i$ as having a particular one of the two or more classification values within a current symbol classification, and
    denoising, by the computer system, the noisy symbol sequence according to the current symbol classification to produce a next context-generating symbol sequence.

20. The method of claim 19 wherein the net context-generating symbol sequence produced by a final iteration of method is returned as a noised symbol sequence.

21. A method for classifying symbols, $z_i$, of a noisy symbol sequence, generated by passing a corresponding clean symbol sequence through a noise-inducing channel, as each having one of two or more classification values, the method carried out by a computer system executing computer instructions that implement the method, the method comprising:
  determining, by the computer system, a first set of merged contexts based on non-extreme-valued symbols of the noisy symbol sequence;
  determining, by the computer system, for each merged context of the first set of contexts, an estimated context dependent clean-symbol-sequence symbol-occurrence probability distribution;
  generating, by the computer system, a next symbol classification by,
    for each context-embedded symbol $z_i$ embedded within a merged context $c_i$ of the first set of merged contexts within the noisy symbol sequence, generating, by the computer system, a next symbol classification by classifying the context-embedded symbol $z_i$ as a particular one of the two or more classification values; and
  in one or more iterations,
    using the next symbol classification, determining, by the computer system, next set of merged contexts for the noisy symbol sequence;
    determining, by the computer system, for each merged context of the next set of merged contexts, an estimated clean-symbol-sequence symbol-occurrence probability distribution;
    generating, by the computer system, a next symbol classification by,
      for each context-embedded symbol $z_i$ embedded within a merged context $c_i$ of the next set of merged contexts within the noisy symbol sequence,
        determining, by the computer system, an estimated clean-symbol-sequence symbol-occurrence probability distribution conditioned on the selected merged context $c_i=c$ and context-embedded symbol $z_i=a_k$, $\hat{P}(x|c,a_k)$, and
        based on $\hat{P}(x|c,a_k)$ and a three input variable dependent loss function $L(x,z,d)$ depending on a clean-symbol-sequence symbol value x, a noisy-symbol-sequence symbol value z, and a class value d, classifying, by the computer system, the context-embedded symbol $z_i$ as having a particular one of the two or more classification values within a current symbol classification.

22. The method of claim 21 further including using a final symbol classification produced in a final iteration to denoise the noisy symbol sequence.

* * * * *

UNITED STATES PATENT AND TRADEMARK OFFICE
CERTIFICATE OF CORRECTION

PATENT NO.       : 7,783,123 B2
APPLICATION NO.  : 11/527062
DATED            : August 24, 2010
INVENTOR(S)      : Erik Ordentlich et al.

It is certified that error appears in the above-identified patent and that said Letters Patent is hereby corrected as shown below:

In column 23, line 40, in Claim 5, delete "Otherwise" and insert -- otherwise --, therefor.

In column 23, line 46, in Claim 6, delete "a" and insert -- as --, therefor.

In column 23, line 47, in Claim 6, delete " $\lambda_C \hat{P}(x \neq a_k | c, a_k) > \hat{P}(x = a_k | c, a_k)$ " and insert -- $\lambda_C \hat{P}(x \neq a_k | c, a_k) > \lambda_N \hat{P}(x = a_k | c, a_k)$ --, therefor.

In column 23, line 47, in Claim 6, delete "and," and insert -- and --, therefor.

In column 23, line 58, in Claim 9, delete "implemented" and insert -- implement --, therefor.

In column 24, line 8, in Claim 11, after "sequence," insert -- each --.

In column 24, line 18, in Claim 12, delete "within," and insert -- within --, therefor.

In column 24, line 19, in Claim 12, delete "each -binary" and insert -- each-binary --, therefor.

In column 24, line 42, in Claim 13, delete "each," and insert -- each --, therefor.

In column 24, line 51, in Claim 14, delete "bit occurrence" and insert -- bit-occurrence --, therefor.

In column 24, line 53, in Claim 14, after "selecting" insert -- a --.

In column 24, line 54, in Claim 14, delete "front" and insert -- from --, therefor.

In column 24, line 58, in Claim 14, delete "multiplying" and insert -- multiplying, --, therefor.

Signed and Sealed this
Fifteenth Day of February, 2011

David J. Kappos
*Director of the United States Patent and Trademark Office*

CERTIFICATE OF CORRECTION (continued)
U.S. Pat. No. 7,783,123 B2

In column 24, line 59, in Claim 14, delete "model-matrix" and insert -- model matrix --, therefor.

In column 24, line 66, in Claim 15, delete "counts" and insert -- counts, --, therefor.

In column 25, line 6, in Claim 16, after "sequence" insert -- symbols --.

In column 25, line 39, in Claim 19, after " $\hat{P}(x|c,a_k)$ " insert -- , --.

In column 25, line 52, in Claim 20, delete "net" and insert -- next --, therefor.

In column 25, line 54, in Claim 20, before "method" insert -- the --.

In column 25, line 54, in Claim 20, delete "noised" and insert -- denoised --, therefor.

In column 26, line 20, in Claim 21, delete "as a" and insert -- as having a --, therefor.

In column 26, line 25, in Claim 21, delete "next" and insert -- a next --, therefor.